US011878682B2

(12) United States Patent
Lee et al.

(10) Patent No.: US 11,878,682 B2
(45) Date of Patent: Jan. 23, 2024

(54) PATH PLANNING AND CONTROL TO ACCOUNT FOR POSITION UNCERTAINTY FOR AUTONOMOUS MACHINE APPLICATIONS

(71) Applicant: NVIDIA Corporation, Santa Clara, CA (US)

(72) Inventors: Seungho Lee, San Jose, CA (US); Michael Watson, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 762 days.

(21) Appl. No.: 16/895,250

(22) Filed: Jun. 8, 2020

(65) Prior Publication Data

US 2021/0380099 A1  Dec. 9, 2021

(51) Int. Cl.
*B60W 30/09* (2012.01)
*G08G 1/01* (2006.01)
(Continued)

(52) U.S. Cl.
CPC ............. *B60W 30/09* (2013.01); *G06N 5/022* (2013.01); *G08G 1/0112* (2013.01);
(Continued)

(58) Field of Classification Search
CPC ................ B60W 30/09; B60W 4/404; B60W 2300/145; B60W 2050/0031; B60W 2050/0033; B60W 60/0011; B60W 60/0015; B60W 30/18163; B60W 2300/125; B60W 2300/126;
(Continued)

(56) References Cited

U.S. PATENT DOCUMENTS 10,885,698 B2  1/2021  Muthler et al.
2021/0046924 A1*  2/2021  Caldwell ........... B60W 30/0956
(Continued)

OTHER PUBLICATIONS

Quoc-Hung Lu, Soheib Fergani, Carine Jauberthie, Francoise Le Gall, Optimally Bounded Interval Kalman Filter, 2019, IEEE, 2019 IEEE 58th Conference on Decision and Control, pp. 379-382 (Year: 2019).*

(Continued)

*Primary Examiner* — Aniss Chad
*Assistant Examiner* — Chase L Cooley
(74) *Attorney, Agent, or Firm* — Taylor English Duma L.L.P.

(57) ABSTRACT

In various examples, systems and methods are disclosed for generating and/or analyzing candidate paths for a multi-body vehicle—e.g., a tractor trailer truck—based on obstacle avoidance considerations and using an uncertainty representation for the vehicle. The uncertainty representation may correspond to a trailer portion of the multi-body vehicle to account for the variations in rotation of the trailer with respect to the tractor. As such, the uncertainty representation may be indicative of a probability that the trailer of the vehicle occupies locations and/or points in world space. This probability—combined with the probability of locations of actors in the environment—may be used to generate candidate paths that satisfy various constraints—e.g., a minimum stochastic distance—between the vehicle and the actor.

20 Claims, 15 Drawing Sheets

(51) Int. Cl.
    *G08G 1/16*    (2006.01)
    *G06N 5/022*   (2023.01)
    *G06N 3/08*    (2023.01)
(52) U.S. Cl.
    CPC .......... *G08G 1/0133* (2013.01); *G08G 1/0145* (2013.01); *G08G 1/166* (2013.01); *G08G 1/167* (2013.01); *B60W 2300/145* (2013.01); *G06N 3/08* (2013.01)
(58) Field of Classification Search
    CPC .......... B60W 2556/20; B60W 2556/65; G06N 5/022; G06N 3/08; G06N 3/045; G08G 1/0112; G08G 1/0145; G08G 1/166; G08G 1/167; G08G 1/096716; G08G 1/096758; G08G 1/0141; G08G 1/04; G08G 1/096775
    See application file for complete search history.

(56)  References Cited

U.S. PATENT DOCUMENTS

| | | | |
|---|---|---|---|
| 2021/0064890 A1* | 3/2021 | Murveit | G01S 13/931 |
| 2021/0197852 A1* | 7/2021 | Fairfield | B60W 60/001 |
| 2022/0161782 A1* | 5/2022 | Laine | B60W 30/04 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

IEC 61508, "Functional Safety of Electrical/Electronic/Programmable Electronic Safety-related Systems (E/E/PE, or E/E/PES)," Retrieved from Internet URL: https://en.wikipedia.org/wiki/IEC_61508, accessed on Apr. 1, 2022, 7 pages.

ISO 26262, "Road vehicle—Functional safety," International Standard for Functional Safety of Electronic System, Retrieved from Internet URL: https://en.wikipedia.org/wiki/ISO_26262, accessed on Sep. 13, 2021, 8 pages.

* cited by examiner

PATH PLANNING AND CONTROL TO ACCOUNT FOR POSITION UNCERTAINTY FOR AUTONOMOUS MACHINE APPLICATIONS

BACKGROUND

For autonomous vehicles to achieve autonomous driving levels 3-5 (e.g., conditional automation (Level 3), high automation (Level 4), and full automation (Level 5), as defined by the Society of Automotive Engineers standard J3016), the autonomous vehicles must be capable of operating safely in all environments, and without the requirement for human intervention when potentially unsafe situations present themselves. In order to meet this standard, obstacle and collision avoidance systems need to be implemented in the autonomous vehicles that do not contribute to or increase the likelihood or imminence of a collision (e.g., with another human operated vehicle, outside of the control of the autonomous vehicle). In addition, the obstacle and collision avoidance systems should be implemented in a way that feels natural to occupants of the autonomous vehicles, such that the autonomous vehicle does not execute harsh, abrupt, or erratic maneuvers unless needed to ensure the safety of the occupants.

In particular, autonomous vehicles must be capable of operating safely in all environments, without requiring human intervention when potentially unsafe situations present themselves. In order to meet this safety standard, autonomous vehicles may leverage various systems that are used to determine potential paths and to execute obstacle avoidance and other safety-related operations. With respect to larger, more dynamic, autonomous vehicles—such as semi-trucks—special or additional considerations need to be taken into account during path planning and/or obstacle and collision avoidance to ensure the vehicle traverses the environment safely. In conventional systems, dedicated sensors are attached to areas of the vehicle that may allow for monitoring a state of the vehicle. For instance, in a semi-truck with a tractor and a trailer, dedicated sensors attached to the trailer may be leveraged during path planning and/or obstacle and collision avoidance determinations. However, for these systems to operate correctly, each trailer must not only have sensors, but must have the requisite sensors that are compatible with the systems executing on the tractor. In addition, these sensors must be specially calibrated for the specific implementation before suitable operation, which may be burdensome and reduce efficiency. As a result, where these systems are deployed, and the trailer does not include sensors or does not include compatible sensors, the position of the trailer may be unknown. This may require fitting the trailer with sensors—which is time consuming, burdensome, and costly—or may require searching for a different, suitable trailer.

SUMMARY

Embodiments of the present disclosure relate to path planning and control to account for position uncertainty for autonomous machine applications. Systems and methods are disclosed that generate and select candidate paths for a vehicle—such as a tractor trailer—using an uncertainty representation for the vehicle.

In contrast to conventional systems, such as those described above the systems and methods of the present disclosure allow for path planning and control of larger autonomous vehicles—e.g., vehicles with two or more separate bodies that move relative to one another—without the need for dedicated sensors. In particular, the current system is capable of predicting a location of an autonomous vehicle as the vehicle moves forward in time while requiring only basic information about the autonomous vehicle (e.g., vehicle dimensions, orientation, and/or a target location). Such a predicted location will have some degree of position uncertainty, and the system may account for this uncertainty when analyzing, determining, and/or selecting a path. In addition, the current system may—instead of relying on sensor information of a trailer—leverage computations of propagated motion with disturbance considerations to determine an estimated region of potential locations of separate bodies of the vehicle (e.g., a tractor and a trailer) at any number of time steps. Such information may allow for, as an example, modeling trailer position uncertainty for consideration during path planning for the autonomous vehicle.

After determining an uncertainty representation at a target location, a path for the autonomous vehicle may be analyzed, penalized, generated, and/or selected. For instance, a constraint may be enforced between the vehicle and an obstacle—such as another vehicle—to enforce a minimum stochastic distance between one or more points on the modeled tractor trailer and the obstacle over a plurality of points of a path. This minimum stochastic distance can be used in path planning such that the path selected for the vehicle maintains the minimum stochastic distance from the obstacle at all times. In this way, multiple path candidates can be generated for the vehicle and, after analysis of the paths in view of position uncertainty, the paths that satisfy the constraints or most closely satisfy the constraints may be indicated to be valid paths for the vehicle in traversing a current environment safely.

BRIEF DESCRIPTION OF THE DRAWINGS

The present systems and methods for path planning and control to account for position uncertainty for autonomous machine applications are described in detail below with reference to the attached drawing figures, wherein.

DETAILED DESCRIPTION

Figure 1:
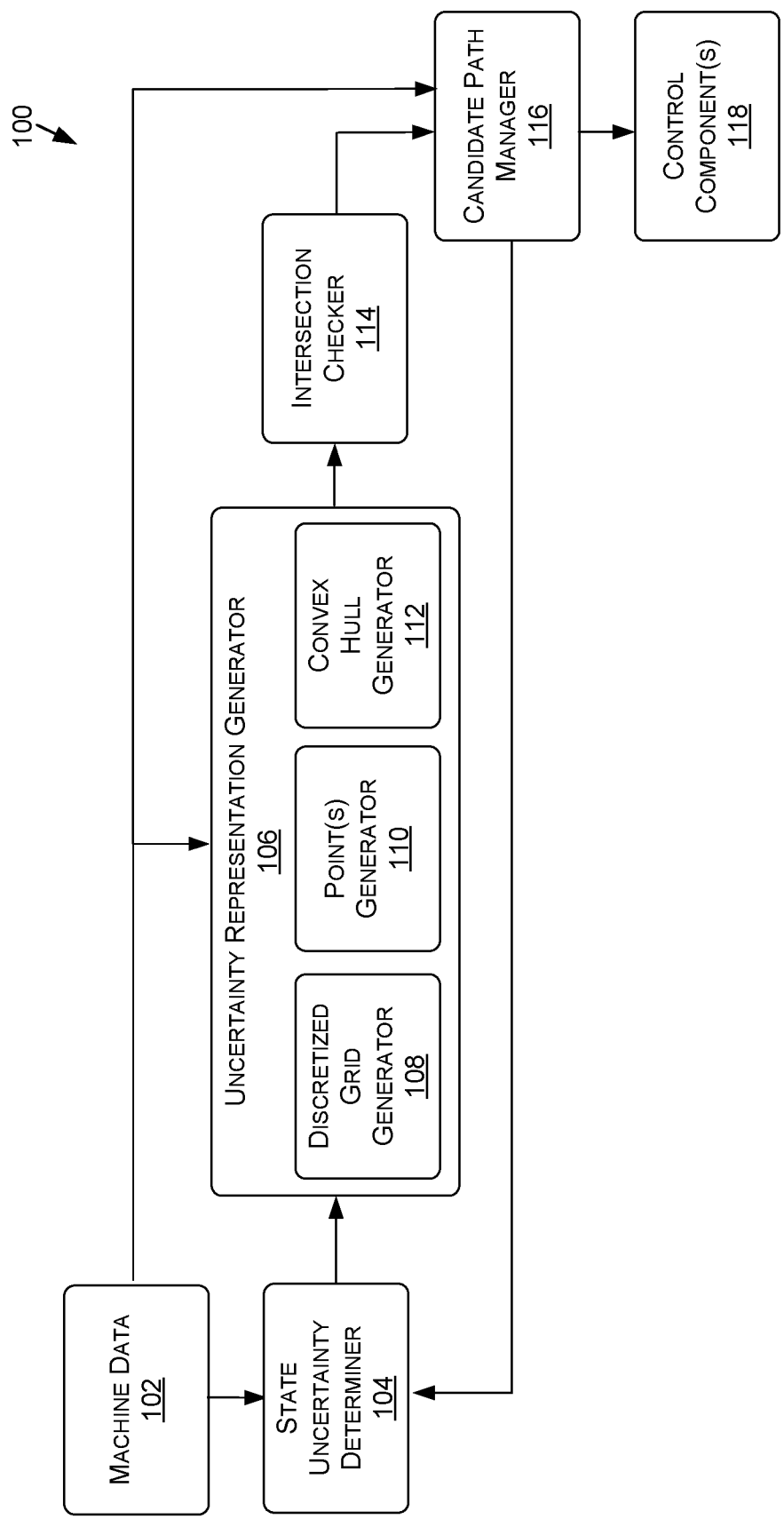
FIG. 1 includes an example data flow diagram for a process of path selection based on collision avoidance considerations using an uncertainty representation for a vehicle, in accordance with some embodiments of the present disclosure.

Systems and methods are disclosed related to path planning and control to account for position uncertainty for autonomous machine applications. Although the present disclosure may be described with respect to an example autonomous vehicle 800 (alternatively referred to herein as "vehicle 800" or "ego-vehicle 800," an example of which is described with respect to FIGS. 8A-8D, this is not intended to be limiting. For example, the systems and methods described herein may be used by, without limitation, non-autonomous vehicles, semi-autonomous vehicles (e.g., in one or more adaptive driver assistance systems (ADAS)), robots, warehouse vehicles, off-road vehicles, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to autonomous driving systems, this is not intended to be limiting. For example, the systems and methods described herein may be used in a simulation environment (e.g., to more accurately simulate movement and control of objects in the simulation environment), in robotics, aerial systems, boating systems, and/or other technology areas, such as for path planning, obstacle avoidance, and/or other processes.

The systems and methods of the present disclosure may use various uncertainty representations to indicate a set of predicted positions of a trailer coupled to a tractor—or other autonomous vehicle type. An uncertainty representation can be determined in real-time so the position of the trailer of the autonomous vehicle can be used in path planning and selection determinations. For example, a path generator (as part of a candidate path manager) may generate any number of paths having associated target locations (e.g., determined using any number of path generation techniques), and the uncertainty representations for the autonomous vehicle may be generated for the target locations to represent potential future footprints of the vehicle at the locations. In selecting an approach to determine the uncertainty representation, various considerations can be taken into account. For instance, some approaches—such as using a discretized grid, described in more detail herein—may be highly accurate in predicting a position of the trailer of the autonomous vehicle; however, such approaches may require more computational resources. On the other hand, approaches that leverage footprints of equal probability, as described in more detail herein, may be less accurate (although still achieving a level of safety required for autonomous driving) than approaches that use more points, but may be more computationally efficient. As such, an importance between latency or run time and accuracy may be determined, and this determination may aid in selecting an uncertainty modeling approach for a given implementation, or for a given instance thereof. In any embodiments, a linear feedback controller may be implemented to prevent the uncertainty representation from going unbounded.

With the determination of an uncertainty representation for the autonomous vehicle and/or one or more surrounding objects or obstacles, a path for the autonomous vehicle can be analyzed in view of one or more constraints, and the path may be penalized and/or a new path may be generated based on the analysis. For instance, various constraints may be enforced—such as to maintain minimum stochastic (or statistical) distances from an actor (e.g., an obstacle)—such that generated and/or selected paths conform to the constraints with respect to surrounding obstacles—e.g., dynamic actors, vehicles, stationary objects, etc.—at all times. As an example, two or more path candidates may be generated at each time step—e.g., a first path candidate may correspond to the autonomous vehicle staying in the current lane and a second path candidate may correspond to a lane change. These two paths may have been obtained by solving a constraint optimization problem such that each of the paths satisfy the constraints enforced thereon, such as a stochastic distance constraint. A path selector—e.g., of a planning layer—may thus select one of the paths to follow, and this information may be passed to control components of the vehicle for controlling the vehicle according to the path. For instance, when a lane change is triggered, a selected path candidate corresponding to a lane change generated and/or analyzed based on the uncertainty representation for the autonomous vehicle at any number of points along the path can be used to ensure that the autonomous vehicle can successfully change lanes while avoiding any obstacles in the lane of the vehicle and/or surrounding lanes of the vehicle.

With reference now to FIG. 1, FIG. 1 includes an example data flow diagram for a process 100 of generating and selecting a path based on collision avoidance considerations using an uncertainty representation of a vehicle, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Figure 9:
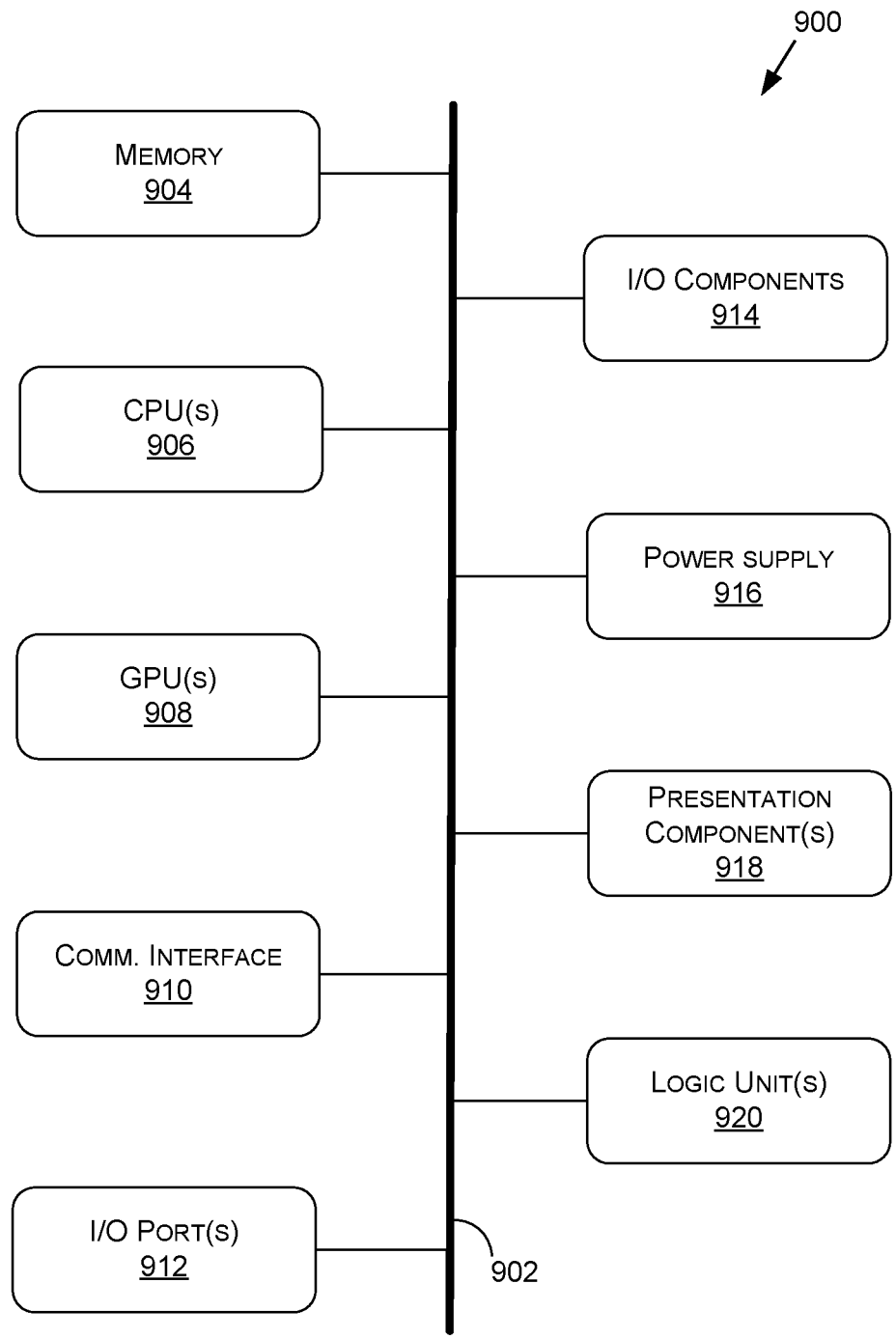
FIG. 9 is a block diagram of an example computing device suitable for use in implementing some embodiments of the present disclosure.

In some embodiments, operations executed by any of the various components of the system, such as determining a state uncertainty by a state uncertainty determiner 104, determining an uncertainty representation by an uncertainty representation generator 106, intersection checks or other constraint enforcement by an intersection checker 114 (alternatively referred to herein as a "constraint enforcer 114"), generating a candidate path by a candidate path generator of the candidate path manager 116 (e.g., to be analyzed by the state uncertainty determiner 104 and/or based on analysis in view of outputs of the state uncertainty determiner 104), and/or selecting a path by a path selector (which may be part of the candidate path manager 116), may be executed—e.g., in parallel—using one or more parallel processing units of the vehicle 800, another object or vehicle, and/or by another device—such as a device including some or all of the components, features, and/or functionality of example computing device 900 of FIG. 9).

The process 100 may include obtaining machine data 102 related to the vehicle 800. The machine data 102 may be used by the vehicle 800, and within the process 100, to determine a state uncertainty for the vehicle 800, to determine an uncertainty representation for the vehicle 800, to generate candidate paths for the vehicle 800, to perform intersection checks between the vehicle 800 and actors in the environment (e.g., other vehicles, pedestrians, bicyclists, etc.), and/or to select a path from the candidate paths. The machine data 102 may include, without limitation, data generated based at least in part on one or more sensors of the vehicle 800 (e.g., IMU sensors 866, speed sensors 844, steering sensors 840, and/or other sensors, such as those described with respect to FIGS. 8A-8D) and/or vehicle information (e.g., dimensions of the vehicle, length and/or width of a tractor frame, length and/or width of a trailer frame, etc.).

The machine data 102 may be used, at least in part, by a state uncertainty determiner 104 to determine a state uncertainty for the vehicle 800 at various points—current or future—along one or more paths generated by a candidate path generator of the candidate path manager 116. For example, the candidate path manager 116 may generate one or more candidate paths—as described in more detail herein—and the world space locations associated with points along the path (e.g., spaced at half meter increments, one meter increments, two meter increments, etc.) may be analyzed by the state uncertainty determiner 104 to estimate or predict footprints of the vehicle 800. As such, the state uncertainty of the vehicle 800 may generally represent an estimated position and orientation of one or more bodies of a vehicle 800—such as a tractor and/or trailer of a tractor trailer truck—at various locations along a target path. In some embodiments, the state of the tractor may be known, as determined using one or more sensors of the tractor, but the trailer state may be unknown. As such, using the systems and methods described herein, an estimated representation of potential locations of the trailer may be generated without requiring additional sensors be disposed on or otherwise associated with the trailer—e.g., thereby accounting for the drawback of conventional systems. However, in some embodiments, the state uncertainty of the trailer may be modeled using additional or alternative data from one or more sensors disposed on the trailer without departing from the scope of the present disclosure.

In an embodiment, the state uncertainty of the vehicle 800 may be based on kinematic model motion. The kinematic model motion may rely on a simplified, kinematic model of the vehicle 800, represented as follows, in equations (1)-(3):

$$\dot{X} = v_x \cos \psi \tag{1}$$

$$\dot{Y} = -v_x \sin \psi \tag{2}$$

$$\dot{\psi} = v_x \kappa \tag{3}$$

In addition, the kinematic model motion may rely on a smooth and feasible command trajectory (e.g., as generated by the candidate path manager 116), represented as follows, in equations (4)-(5):

$$X^*(t) = f(t) \tag{4}$$

$$Y^*(t) = g(t) \tag{5}$$

In equations (1)-(5), X and Y may represent the position of the vehicle 800 origin (e.g., an origin location, such as a center point of an axle, such as the rear axle, a front most point of a vehicle, or another selected or modeled origin), resolved in some inertial frame, N, where $v_x$ is the longitudinal velocity, $\psi$ is the heading angle, and $\kappa$ is the curvature. Given this nominal command path, the yaw rate of the vehicle 800 may be represented as follows, in equation (6):

$$\psi^*{}_1(t) = \arctan 2(\dot{f}(t), \dot{g}(t)) \tag{6}$$

which may imply a nominal trajectory, represented as follows, in equation (7):

$$\dot{\psi}_1^*(t) = \frac{\ddot{f}(t)\dot{g}(t) - \ddot{g}(t)\dot{f}(t)}{\dot{f}^2(t) + \dot{g}^2(t)} \tag{7}$$

The state $q = [X, Y, \psi]^T$ may have a perturbation, $\delta q = q - q^*$ on the nominal trajectory represented in equation (7). All un-modeled effects and disturbances may be lumped into a disturbance, w. Then, because the dynamics of the perturbation are not a function of the state, the dynamics of the perturbation may be represented as follows, in equation (8):

$$\dot{\delta q} = w \tag{8}$$

It may be assumed that w is a Gaussian white noise process with 0 mean. In embodiments, to prevent the dynamics of the perturbation from growing unbounded, a proportional correcting term may be added as a simplified stand-in of a feedback controller, represented as follows, in equation (9):

$$\dot{\delta q} = -K \delta q + w \tag{9}$$

Equation (9) and associated covariance equations may be discretized and propagated to determine an uncertainty state for the vehicle 800. In some embodiments, equation (9) may apply to higher fidelity vehicle models.

In another embodiment, the state uncertainty of the vehicle 800 may be based on a dynamic motion model. In particular, the dynamic motion model may add an expected yaw error based on an understeering coefficient and a pseudo steady-state assumption.

In a further embodiment, the state uncertainty of the vehicle 800 may be based on a tractor-trailer kinematic model. In particular, the tractor-trailer kinematic model may be used as a model when conditions are met that include a low enough vehicle speed that a kinematic model (no tire side slip) is a reasonable nominal assumption, and a virtual real axle exists such that lateral velocity at that point equals zero on both tractor and trailer. When using a tractor-trailer kinematic model, several frames may be considered such as, N (e.g., an inertial frame with basis vectors $n = [n_1, n_2, n_3]^T$), A (e.g., some local frame that is reset with each new plan, with basis vectors $a = [a_1, a_2, a_3]^T$), B (e.g., a body-fixed frame attached to the tractor with basis vectors $b = [b_1, b_2, b_3]^T$), and C (e.g., a body-fixed frame attached to the trailer with basis vectors $c = [c_1, c_2, c_3]^T$).

The tractor-trailer kinematic model may use two inputs, a steering angle, δ, and a tractor rear-axle longitudinal velocity, $v_{1r}$. Using a kinematic constraint of the tractor (e.g., no tire slip), the tractor yaw rate, $\dot{\psi}_1$, may be represented as follows, in equation (10):

$$\dot{\psi}_1 = \frac{v_{1r}}{l_r}\tan(\delta) \qquad (10)$$

The velocity vector of the fifth wheel attachment point, $p_{2f}$, resolved in the tractor body frame may be represented as follows, in equation (11):

$$v_{2f} \cdot b = \left[v_{1r}, \frac{v_{1r}l_{1h}}{l_1}\tan(\delta), 0\right]^T \qquad (11)$$

The articulation angle between the tractor and trailer, $\psi_a$, may be used to construct a direction cosine matrix from the tractor frame to the trailer frame, $T_{C/B}$ may be represented as follows, in equation (12):

$$T_{C/B} = \begin{bmatrix} \cos(\psi_a) & -\sin(\psi_a) \\ \sin(\psi_a) & \cos(\psi_a) \end{bmatrix} \qquad (12)$$

A velocity vector of the fifth wheel attachment point, $p_{2f}$, resolved in the trailer coordinate frame may be represented as follows, in equations (13)-(14):

$$v_{2f} \cdot c = T_{C/B} v_{2f} \cdot b \qquad (13)$$

$$= \begin{bmatrix} \cos(\psi_a)v_{1r} - \sin(\psi_a)\frac{v_{1r}l_{1h}}{l_1}\tan(\delta) \\ \sin(\psi_a)v_{1r} + \cos(\psi_a)\frac{v_{1r}l_{1h}}{l_1}\tan(\delta) \\ 0 \end{bmatrix} \qquad (14)$$

Applying kinematic constraints on the trailer, a trailer real axle velocity, $v_{2r}$, may be obtained, where the trailer real axle velocity may be represented as follows, in equation (15):

$$v_{2r} = \cos(\psi_a)v_{1r} - \sin((\psi_a)\frac{v_{1r}l_{1h}}{l_1}\tan\delta \qquad (15)$$

Further, applying kinematic constraints on the trailer, a trailer yaw rate, $\dot{\psi}_2$, may be obtained, where the trailer yaw rate may be represented as follows, in equation (16):

$$\dot{\psi}_2 = \frac{v_{1r}}{l_2}\sin(\psi_a) + \frac{v_{1r}l_{1h}}{l_1 l_2}\cos((\psi_a)\tan(\delta) \qquad (16)$$

The articulation angle rate, $\dot{\psi}_a$ may be represented as follows, in equation (17):

$$\dot{\psi}_a = \dot{\psi}_1 - \dot{\psi}_2 = \frac{v_{1r}}{l_1}\tan(\delta) - \left(\frac{v_{1r}}{l_2}\sin(\psi_a) + \frac{v_{1r}l_{1h}}{l_1 l_2}\tan(\delta)\right) \qquad (17)$$

The tractor yaw angle and the articulation angle may be chosen as state variables and the steering angle and the tractor rear axle velocity may be chosen as inputs such that the tractor-trailer kinematic model may be represented as follows, in equation (18):

$$\frac{d}{dt}\begin{bmatrix}\psi_1 \\ \psi_a\end{bmatrix} = \begin{bmatrix} \frac{v_{1r}}{l_1}\tan(\delta) \\ \frac{v_{1r}}{l_2}\tan(\delta) - \left(\frac{v_{1r}}{l_2}\sin(\psi_a) + \frac{v_{1r}l_{1h}}{l_1 l_2}\cos(\psi_a)\tan(\delta)\right) \end{bmatrix} \qquad (18)$$

In embodiments, a curvature and some uncertainty on slip angles of tires may be used to predict state uncertainty. In particular, equations discussed herein may be used to model how uncertainty evolves for a given path and to use the state uncertainty to determine a distribution of a tractor/trailer configuration for the vehicle 800. For instance, at some point t0 in time, a path may be provided from a planning layer to a control layer in some local frame, A, that is coincident and aligned with tractor body frame, B, at time t0. A may be an inertial frame, and B may be a body fixed frame attached to a tractor. The command position of the B frame origin, $r_1$, resolved around the A frame may be represented as follows, in equation (19):

$$r_1^* \cdot a = \begin{bmatrix} x_1^*(t) \\ y_1^*(t) \end{bmatrix} = \begin{bmatrix} f(t) \\ g(t) \end{bmatrix} \qquad (19)$$

Due to disturbances, measurement errors, and controller errors, some error may be assumed to be present in the dynamics of the position that may be represented as follows, in equation (20):

$$r_1 \cdot a = r_1^* \cdot a + \begin{bmatrix} \delta x_1 \\ \delta y_1 \end{bmatrix} \qquad (20)$$

The longitudinal and lateral dynamic disturbances/controllers may be decoupled and may be modeled as the error dynamics of the position, which may be represented as follows, in equations (21)-(22):

$$\begin{bmatrix} \delta \dot{x}_1 \\ \delta \dot{y}_1 \end{bmatrix} = w_{xy} - K_{xy}\begin{bmatrix} \delta x_1 \\ \delta y_1 \end{bmatrix} \qquad (21)$$

$$K_{xy} = T_{A/B}^* \begin{bmatrix} k_x & 0 \\ 0 & k_y \end{bmatrix} T_{B/A} \qquad (22)$$

The yaw angle relative to frame A may be redefined at the start of each state uncertainty determination without losing generality. Given a nominal command path, the yaw angle of the tractor with no slip on the rear axle group center may be represented as follows, in equation (23):

$$\psi^*_1(t) = \text{arc tan } 2(\dot{g}(t), \dot{f}(t)) \text{ where arguments are ordered } (y, x) \qquad (23)$$

Equation (23) may be used to imply a nominal yaw-rate trajectory which may be represented as follows, in equation (24):

$$\dot{\psi}_1^*(t) = \frac{\ddot{f}(t)\dot{g}(t) - \ddot{g}(t)\dot{f}(t)}{\dot{f}^2(t) + \dot{g}^2(t)} \tag{24}$$

In some embodiments, a slip angle, $\alpha_1$, for the tractor rear axle group may be approximately equivalent to yaw angle offset from the nominal trajectory yaw angle. Therefore, the dynamics may have some process noise, $w_{\alpha 1}$, added that may relate to the slip. In addition, a feedback element on the error may also be added to represent effects of controller feedback, which may be represented as follows, in equation (25):

$$\dot{\psi}_1(t) = \frac{\ddot{f}(t)\dot{g}(t) - \ddot{g}(t)\dot{f}(t)}{\dot{f}^2(t) + \dot{g}^2(t)} + w_{\alpha_1}(t) - k_{\psi_1}(\psi_1 - \psi_1^*) \tag{25}$$

An articulation angle between the tractor and trailer may be obtained. In particular, a velocity of the trailer rear axle, $v_{2r}$, may be determined. The velocity of the trailer rear axle may be represented as follows, in equations (26)-(27):

$$v_{2r} = v_2 f - l_2 \dot{\psi}_2 c_2 \tag{26}$$

$$= \dot{r}_1 + l_{1h}\dot{\psi}_1 b_2 + l_2(\dot{\psi}_a - \dot{\psi}_1)c_2 \tag{27}$$

When resolved in the trailer frame, equations (26)-(27) may be represented as follows, in equation (28):

$$v_{2r} \cdot c_2 = -\sin(\psi_1 - \psi_a)\dot{y}_1 + \cos(\psi_1 - \psi_a)\dot{g} + l_{1h}\dot{\psi}_1 \cos \psi_a + l_2(\dot{\psi}_a - \dot{\psi}_1) \tag{28}$$

In some embodiments, under no-slip conditions, an assumption may be made that, nominally, $V_{2r} \cdot c_2$ equals zero. Based on this assumption and the addition of some process noise, $w_{\alpha 2}$, added, equation (28) may be updated as follows, in equation (29):

$$-\sin(\psi_1-\psi_a)\dot{x}_1 + \cos(\psi_1-\psi_a)\dot{y}_1 + l_{1h}\dot{\psi}_1\cos\psi_a + l_2(\dot{\psi}_a - \dot{\psi}_1) = l_2 w_{\alpha 2} \tag{29}$$

For the trailer rear axle group, a side slip angle, $\alpha 2$, may be determined. The side slip angle may be represented as follows, in equation (30):

$$\tan\alpha_2 = \frac{v_{2r} \cdot c_2}{v_{2r} \cdot c_1} \tag{30}$$

Equation (30) may then be used to determine a level of process noise, $w_{\alpha 2}$, in the dynamics. Combining the herein described equations, the dynamics of the system may be represented as follows, in equations (31)-(33):

$$\dot{\psi}_1 = \dot{\psi}_1^* - K_{\psi_1}(\psi_1 - \psi_1^*) + w_{\psi_1} \tag{31}$$

$$\dot{\psi}_a = \dot{\psi}_1 - \begin{bmatrix} 0 & \frac{1}{l_2} & 0 \end{bmatrix} T_{C/B} \left( T_{B/A} \begin{bmatrix} \dot{x}_1 \\ \dot{y}_1 \end{bmatrix} + \begin{bmatrix} 0 \\ l_{1h}\dot{\psi}_1 \end{bmatrix} \right) + w_{\psi_1} \tag{32}$$

$$\begin{bmatrix} \dot{x}_1 \\ \dot{y}_1 \end{bmatrix} = \begin{bmatrix} \dot{f} \\ \dot{g} \end{bmatrix} - K_{xy}\begin{bmatrix} x_1 - x_1^* \\ y_1 - y_1^* \end{bmatrix} + T_{A/B}\begin{bmatrix} w_x \\ w_y \end{bmatrix} \tag{33}$$

Further, defining $q=[\psi_1, \psi_a, x1, y1]^T$ and linearizing the dynamics of the herein described equations may be represented as follows, in equations (34)-(46):

$$F = \frac{\partial \dot{q}}{\partial q}\bigg|_{q=q^*} = \begin{bmatrix} \frac{\partial \dot{\psi}_1}{\partial \psi_1} & \frac{\partial \dot{\psi}_1}{\partial \psi_a} & \frac{\partial \dot{\psi}_1}{\partial x_1} & \frac{\partial \dot{\psi}_1}{\partial y_1} \\ \frac{\partial \dot{\psi}_a}{\partial \psi_1} & \ddots & & \vdots \\ \frac{\partial \dot{x}_1}{\partial \psi_1} & & \ddots & \vdots \\ \frac{\partial \dot{y}_1}{\partial \psi_1} & \cdots & \cdots & \frac{\partial \dot{y}_1}{\partial y_1} \end{bmatrix} \tag{34}$$

$$\frac{\partial \dot{\psi}_1}{\partial \psi_1} = -K_{\psi_1} \tag{35}$$

$$\frac{\partial \dot{\psi}_1}{\partial \psi_a} = 0 \tag{36}$$

$$\frac{\partial \dot{\psi}_1}{\partial \begin{bmatrix} x_1 \\ y_1 \end{bmatrix}} = [0 \quad 0] \tag{37}$$

$$\frac{\partial \dot{\psi}_a}{\partial \psi_1} = \left(1 - \begin{bmatrix} 0 & \frac{1}{l_2} \end{bmatrix} T_{C/B} \begin{bmatrix} 0 \\ l_{1h} \end{bmatrix}\right) \frac{\partial \dot{\psi}_1}{\partial \psi_1} - \begin{bmatrix} 0 & \frac{1}{l_2} \end{bmatrix} T_{C/B}\left(\frac{\partial T_{B/A}\begin{bmatrix}\dot{x}_1\\\dot{y}_1\end{bmatrix}}{\partial \psi_1} = \begin{bmatrix} v_B^*(2) \\ -v_B^*(1) \end{bmatrix}\right) \tag{38}$$

$$v_B^* = T_B / A\begin{bmatrix} \dot{x}_1 \\ \dot{y}_1 \end{bmatrix} \tag{39}$$

$$\frac{\partial \dot{\psi}_a}{\partial \psi_a} = -\begin{bmatrix} 0 & \frac{1}{l_2} \end{bmatrix}\frac{\partial T_{C/B}\left(T_{B/A}\begin{bmatrix}\dot{x}_1\\\dot{y}_1\end{bmatrix} + \begin{bmatrix}0\\l_{1h}\dot{\psi}_1\end{bmatrix}\right)}{\partial \dot{\psi}_a} \tag{40}$$

$$= -\frac{1}{l_2}v3(1) \tag{41}$$

$$v3 = T_{C/B}\left(T_{B/A}\begin{bmatrix}\dot{x}_1^*\\\dot{y}_1^*\end{bmatrix} + \begin{bmatrix}0\\l_{1h}\dot{\psi}_1\end{bmatrix}\right) \tag{42}$$

$$\frac{\partial \dot{\psi}_a}{\partial \begin{bmatrix} x \\ y \end{bmatrix}} = -\begin{bmatrix} 0 & \frac{1}{l_2} \end{bmatrix} T_{C/B} T_{B/A} \frac{\partial \begin{bmatrix}\dot{x}_1\\\dot{y}_1\end{bmatrix}}{\partial \begin{bmatrix} x_1 \\ y_1 \end{bmatrix}} \tag{43}$$

$$\frac{\partial \begin{bmatrix}\dot{x}_1\\\dot{y}_1\end{bmatrix}}{\partial \psi_1} = 0 \tag{44}$$

$$\frac{\partial \begin{bmatrix}\dot{x}_1\\\dot{y}_1\end{bmatrix}}{\partial \psi_a} = 0 \tag{45}$$

$$\frac{\partial \begin{bmatrix}\dot{x}_1\\\dot{y}_1\end{bmatrix}}{\partial \begin{bmatrix} x_1 \\ y_1 \end{bmatrix}} = K_{xy} \tag{46}$$

The herein described equations may use an identity represented as follows, in equations (47)-(50):

$$\frac{\partial R_z(\theta)v}{\partial \theta} \approx \frac{\partial (I - \theta_\times) R_z(\theta^*) v}{\partial \theta} \qquad (47)$$

$$= \frac{\partial -\theta_\times R_z(\theta^*) v}{\partial \theta} \qquad (48)$$

$$= \frac{\partial -\theta_\times v'}{\partial \theta} \qquad (49)$$

$$= \begin{bmatrix} v'(2) \\ -v'(1) \end{bmatrix} \qquad (50)$$

Due to the coupling of the dynamics of $\dot{\psi}_a$, noise from other equations may be coupled into those for $\psi_a$. Relevant terms to this may represented as follows, in equations (51)-(54):

$$G = \frac{\partial \dot{q}}{\partial w}\bigg|_{q=q^*} = \begin{bmatrix} 1 & 0 & 0 & 0 \\ G_{\psi_a \psi_1} & 1 & G_{\psi_a x_1} & G_{\psi_a y_1} \\ 0 & 0 & G_{xx} & G_{xy} \\ 0 & 0 & G_{yx} & G_{yy} \end{bmatrix} \qquad (51)$$

$$G_{\psi_a \psi_1} = 1 - \begin{bmatrix} 0 & \frac{1}{l_2} \end{bmatrix} T_{C/B} \begin{bmatrix} 1 \\ 0 \end{bmatrix} \qquad (52)$$

$$\begin{bmatrix} G_{\psi_a x_1} & G_{\psi_a y_1} \end{bmatrix} = -\begin{bmatrix} 0 & \frac{1}{l_2} \end{bmatrix} T_{C/B} \qquad (53)$$

$$\begin{bmatrix} G_{xx} & G_{xy} \\ G_{yx} & G_{yy} \end{bmatrix} = T_{A/B} \qquad (54)$$

Process noise-driven perturbations, $\tilde{q}$, on a nominal trajectory represented as follows, $q^*=[x^*_1, y^*_1, \psi^*_1, \psi_{a*}]^T$, where $q=q^*-\tilde{q}$, may be evaluated on the statistics of the perturbation based on the dynamics of the linearized system, represented as follows, in equation (55):

$$\dot{\tilde{q}} = F\tilde{q} + Gw \qquad (55)$$

In discretized form, represented as follows, in equation (56):

$$\tilde{q}_{k+1} = (I + F\Delta t)\tilde{q}_k + G_k w_k \qquad (56)$$

Initial conditions that may be assumed may be represented as follows, in equations (57)-(60):

$$E[\tilde{q}_k] = 0 \qquad (57)$$

$$E[\tilde{q}_k \tilde{q}_k^T] = Q_k \qquad (58)$$

$$E[w_k] = 0 \qquad (59)$$

$$E[w_k w_k^T] = W_k \qquad (60)$$

In some embodiments, it may also be assumed that the process noise driving the dynamics is uncorrelated with the state uncertainty. The statistics of the error propagate as follows, in equations (61)-(65):

$$E[\tilde{q}_{k+1}] = E[F_k \tilde{q}_k] + E[Gw] \qquad (61)$$

$$= F_k E[\tilde{q}_k] \qquad (62)$$

$$E[\tilde{q}_{k+1} \tilde{q}_{k+1}^T] = E[(F_k \tilde{q}_k + G_k w)(F_k \tilde{q}_k + G_k w_k)^T] \qquad (63)$$

$$= F_k E[\tilde{q}_k \tilde{q}_k^T] F_k^T + G_k E[w_k w_k^T] G_k^T \qquad (64)$$

$$Q_{k+1} = F_k Q_k F_k^T + G_k W_k G_k^T \qquad (65)$$

In some embodiments, the uncertainty state (e.g., spread of the vehicle 800) may be determined where the truck body fixed points are considered. For instance, $p_i^B$ may be some point on the truck body, resolved in B. The point $p_i^B$ when resolved in A, may be represented as follows, in equation (66):

$$p_i^A = \begin{bmatrix} x_1 \\ y_1 \end{bmatrix} + T_{A/B} p_i^B \qquad (66)$$

In addition, points in the trailer frame map to points in the local frame map may be represented as follows, in equation (67):

$$p_j^A = \begin{bmatrix} x_1 \\ y_1 \end{bmatrix} + T_{A/B} \left( \begin{bmatrix} l_{1h} \\ 0 \end{bmatrix} + T_{B/C} \left( \begin{bmatrix} -l_2 \\ 0 \end{bmatrix} + p_j^C \right) \right) \qquad (67)$$

When using equation (66) or (67), the values may be a function of the uncertainty state. An associated covariance of the point position may then be determined as follows, in equations (68)-(71):

$$E[p(q)] = E[p(q^* + \tilde{q})] \approx E\left[p(q^*) + \frac{\partial p}{\partial q}\bigg|_{q=q^*} \tilde{q}\right] \qquad (68)$$

$$= p(q^*) \qquad (69)$$

$$E\left[(p(q) - p(q^*))(p(q) - p(q^*))^T\right] = E\left[\frac{\partial p}{\partial q}\bigg|_{q=q^*} \tilde{q}\tilde{q}^T \frac{\partial p}{\partial q}^T\bigg|_{q=q^*}\right] \qquad (70)$$

$$= \frac{\partial p}{\partial q} Q \frac{\partial p^T}{\partial q} \qquad (71)$$

The uncertainty representation generator 106 may be used to determine an uncertainty representation to indicate a set of predicted footprints of the tractor and/or trailer of the vehicle 800 at various positions along candidate paths or trajectories. The uncertainty representation generator 106 may leverage a discretized grid generator 108, a point(s) generator 110, and/or a convex hull generator 112. In some example, a single method selected from the discretized grid generator 108, the point(s) generator 110, or the convex hull generator 112 may be implemented at each time step (or path point) for a given application. However, in other examples, two or more of the methods may be implemented, such that at different time steps or path points, different methods may be leveraged. For example, two or more of the methods may be used to compute probabilities at each time step or path point, and the highest probability may be used to determine the position uncertainty for that time step or path point. At a next time step, the same or another method may be used, and so on. As such, one or more of the methods implemented by the uncertainty representation generator 106 may be leveraged for various implementations, or for instances thereof.

In some embodiments, the discretized grid generator 108 may be used to generate the uncertainty representation. The uncertainty representation generated by discretized grid generator 108 may be a discretized grid. When using a discretized grid, each cell in the grid may correspond to a location(s) in a real-world environment, and the value associated with the cell may represent the probability of that location(s) being occupied by a body of the autonomous vehicle. For example, a blueprint of the trailer and the nominal state can be used to generate a nominal occupancy grid. Each grid point that is occupied by the nominal trailer position will have a normalized value equal to one. Then, based on a position uncertainty for the trailer section occupying a grid point, the value of the grid point is dispersed out based on an uncertainty or probability density function. From this dispersal, the set of grid points that have non-zero values grows, and the resultant value of each grid point is treated as a probability of that grid point or cell being occupied by the trailer. As such, for each grid point of the grid, the resultant value may correspond to the sum, over all nominal grid points, of the evaluation of the probability distribution given by the uncertainty, weighted by the area of the grid point or cell. In some embodiments, the position uncertainty may be represented as an ellipse—e.g., because lines of equal probability may trace out to form ellipses. In such an ellipse representation, the direction/size of the ellipse may be based on the position uncertainty.

As an example of using a discretized grid, for each point (e.g., an equally spaced grid of points on the trailer) the probability can be dispersed from that single point out to all the points (e.g., spreading the likelihood of where that point will be). Upon summing the probabilities from the various points, an indication is generated of where the trailer is likely to be. For instance, a point inside the nominal trailer footprint will have an extremely high indication that the nominal trailer footprint occupies that point, whereas, the farther a point is outside the nominal trailer footprint, the fewer the overlapping dispersed probabilities, and thus the lower the indication that the trailer occupies a point (e.g., there is less probability being summed up at that location).

Figure 2A:
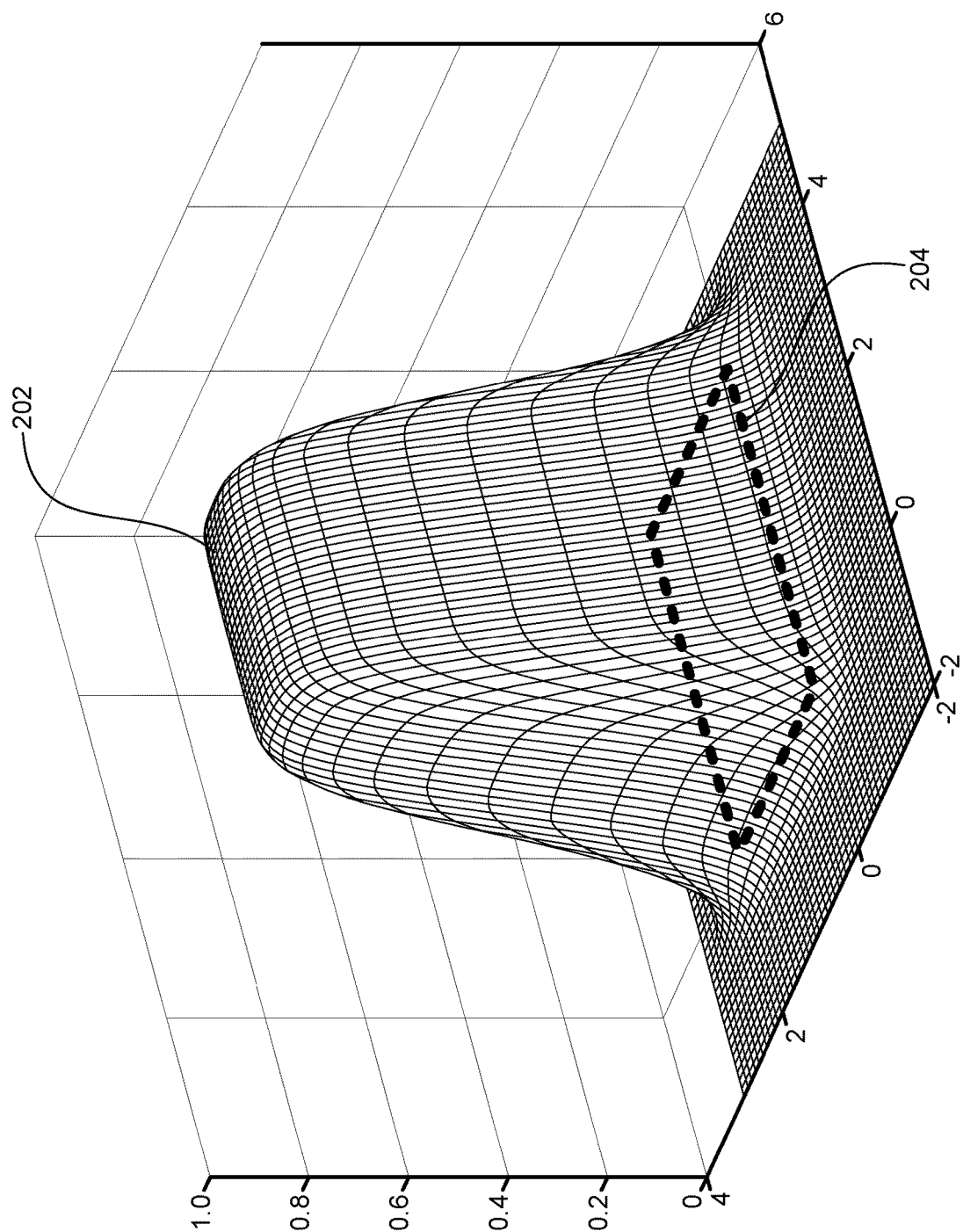
FIGS. 2A-2C depict examples of uncertainty representations for a vehicle, in accordance with some embodiments of the present disclosure.

For instance, with respect to FIG. 2A, FIG. 2A depicts an uncertainty representation based on a discretized grid. The input to generate such an uncertainty representation may be some definition of the nominal body along with an uncertainty of position/rotation as well as a set of evenly spaced grid point center locations. Using, for example, the discretized grid generator 108, an output can be generated that comprises a set of grid point/probability pairs. For each grid point, the evaluations of the probability distributions may be summed over all body points at the grid point. As depicted, mesh 202 may depict the mesh of probabilities that the body footprint covers the grid point where footprint 204 may be the nominal path footprint of vehicle 800—or the trailer thereof. As such, the base of the grid may correspond locations along the ground plane—e.g., the driving surface—in the real-world, and the probability values (e.g., along the vertical axis) may indicate the likelihood that the trailer is occupying that location in space at the current time step or point along the currently analyzed candidate path.

In other embodiments, the point(s) generator 110 may be used to generate the uncertainty representation. The point(s) generator 110 may use the uncertainty of a point or set of points of a vehicle 800—e.g., along a trailer of the vehicle—to determine stochastic distances that may be used by a planning function. When using stochastic distances from a point(s), uncertainty can be determined at each of point individually. For instance, given an uncertainty and an uncertainty level, an area given by an ellipse can represent the set of likely locations of the given point on the trailer of the autonomous vehicle. When using stochastic distances to determine an uncertainty representation, any number of points can be selected for analysis. For example, one or more static points can be selected (e.g., corners of the trailer, such as determined from a top down projected representation of the trailer). As another example, a dynamic set of points can be selected (e.g., a closest point, such as along a boundary or edge, of the autonomous vehicle to a nominal point/configuration of an obstacle). The stochastic distance can be calculated between an ego point on the vehicle 800 and an obstacle point of the obstacle (e.g., a vehicle, a dynamic actor, a static object, etc.). This stochastic distance may then be calculated based on a combination of the physical distance (e.g., in meters, feet, etc.) and the position uncertainty of the nominal locations, where lines of equal stochastic distance may form ellipses. Given the same desired level of confidence, lower uncertainty will result in ellipses of smaller physical dimension than those for a higher level of uncertainty. As such, the physical dimension of the ellipse provides an indication of how much margin should be provided in physical space to avoid an obstacle.

Figure 2B:
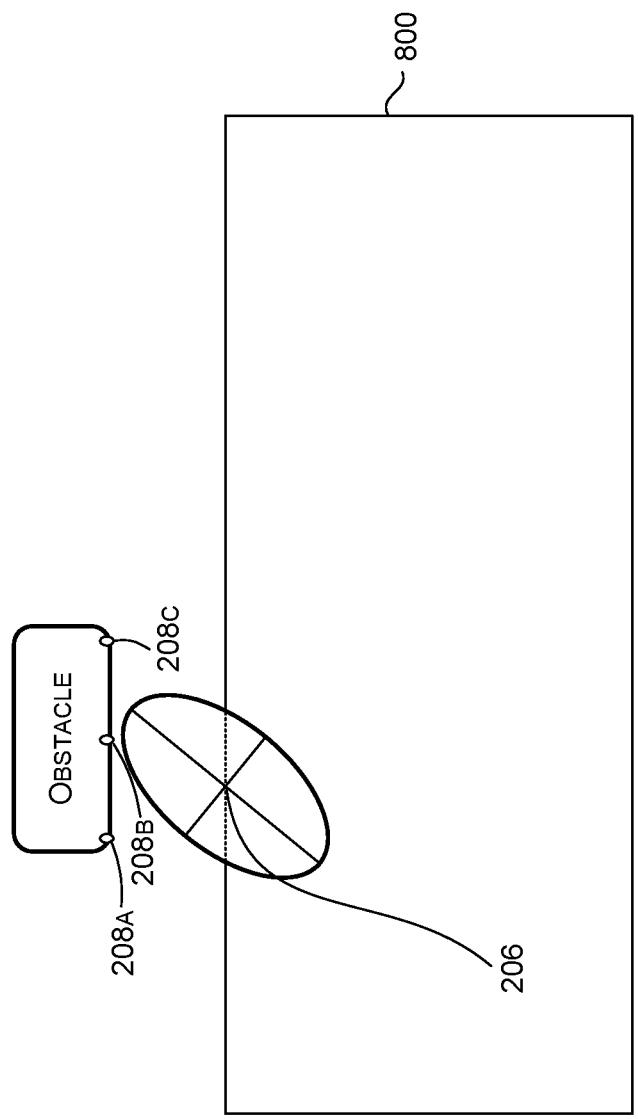

For instance, with respect to FIG. 2B, FIG. 2B depicts an uncertainty representation based on a point. The input to generate such an uncertainty representation may be the state uncertainty of the body, a point or set of points on the vehicle 800 (e.g., on the ego-body boundary, such as corresponding to a trailer of the vehicle 800), and a point or set of points 208 on an obstacle (e.g., on the obstacle boundary/boundaries). For example, point 206 on the vehicle 800 and points 208A-208C on the obstacle may be used as inputs. Using, for example, the point(s) generator 110, an output can be generated based on a maximum cost/minimum (e.g., Mahalanobis) distance of the ego point with respect to the obstacle point (e.g., stochastic distances). To generate this output, one or more (e.g., all) ego point/obstacle point combinations can be analyzed to determine the stochastic distance between the one or more points. From this analysis, the worst case may be stored and used during path planning to maintain a minimum (e.g., stochastic) distance between the vehicle 800 and the obstacle.

In embodiments, the convex hull generator 112 may be used to generate the uncertainty representation. The convex hull generator 112 may use footprints of equal probability as an uncertainty representation as a footprint represented by a convex hull. When using footprints of equal probability, uncertainty can be determined for a set of points. For instance, uncertainty at each point can be represented as an ellipse of likely locations of a given point on the trailer of the autonomous vehicle. When using footprints of equal probability to determine an uncertainty representation, a natural set of points can be selected for analysis. For example, a point at each corner of the trailer, a point at some discrete number of vertices along the trailer edge, etc. A standard deviation value can be chosen when using the footprints of equal probability, and the standard deviation value can affect the confidence value such that a higher standard deviation value indicates a higher confidence that the true future real world footprint of the vehicle 800 will be within the predicted convex hull. Where the footprints of equal probability are represented using ellipses, the ellipses can be created for each point of the set of points. A confidence value or standard deviation value can be used in conjunction with uncertainty to determine the footprint of equal probability for a point, and the standard deviation value can affect the footprint in that a higher standard deviation value will result in a larger footprint. The various ellipses—or points thereon—may be aggregated together to form a convex hull that may correspond to a bounded set of points in the real-world environment (e.g., in world space) that have some likelihood of being occupied by the vehicle 800, or the trailer thereof. As such, at each time step, a convex hull may be generated, and these convex hulls may be propagated forward in time or along points of a candidate path to define estimated location spreads of the vehicle 800 for path analysis and selection.

Figure 2C:
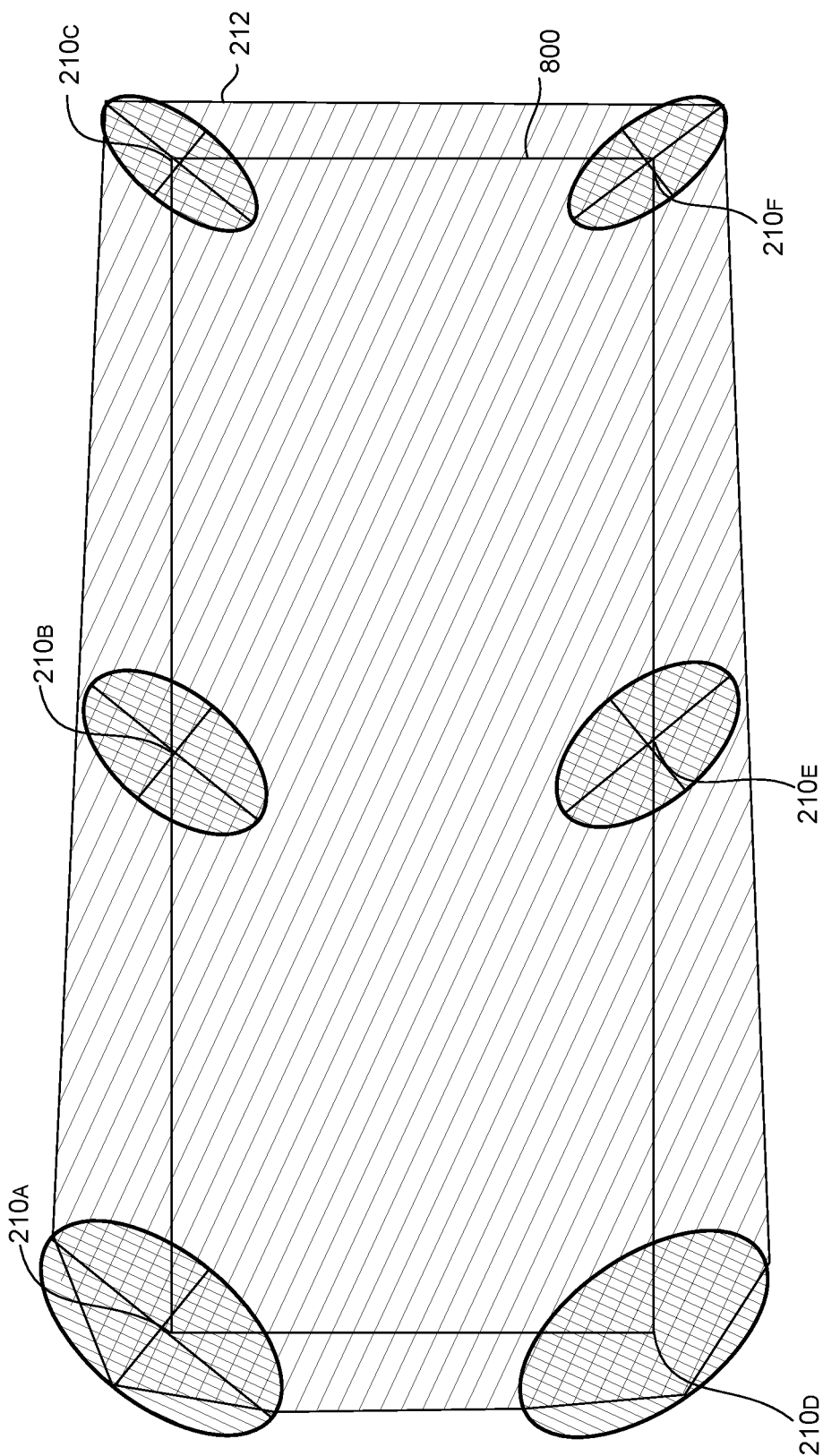

For instance, with respect to FIG. 2C, FIG. 2C depicts an uncertainty representation based on a convex hull of points. The input to generate such an uncertainty representation may be the state uncertainty, a set of points, and a desired probability level. For example, convex points 210A-210F related to the vehicle 800 may be used as inputs. Using, for example, the convex hull generator 112, an output can be generated that is a convex hull of the set of points at a desired probability level. To generate this output, a complete set of points may be generated based on the principal axes of the ellipses to create a convex hull from these points. As depicted, convex hull 212 may be generated based on the input convex points 210A-210F.

With reference again to the candidate path manager 116, the candidate path manager 116 may generate any number of candidate paths (e.g., one per lane, some fixed number, etc.) for analysis by the state uncertainty determiner, the uncertainty representation generator 106, the intersection checker 114, and/or the candidate path manager 116, and/or based on outputs of the state uncertainty determiner 104, the uncertainty representation generator 106, and/or the intersection checker 114. For instance, uncertainty representations generated by the uncertainty representation generator 106 may be used, at least in part, by the candidate path manager 116 to generate one or more candidate paths for the vehicle 800 and/or predicted paths for actors or objects in the environment. For example, the candidate path manager 116 may generate any number of paths for the vehicle 800 that satisfy constraints enforced thereon (e.g., a stochastic distance constraint), and the candidate paths may be analyzed—e.g., in view of safety or collision avoidance considerations, comfort considerations, consistency considerations, power/gas consumption considerations, conforming to rules of the road, etc.—to determine which path to select as the actual path of the vehicle 800. One such consideration, the safety or collision avoidance consideration, may factor in to the final determination of a path for the vehicle 800. This consideration may be used to filter out paths, penalize (e.g., apply or attribute a negative or lower weight value to) paths where collision or possible collision events are predicted between the vehicle 800 and one or more actors, reward (e.g., apply or attribute a positive or higher weight value to) paths where an absence of a collision or possible collision event is predicted, penalize and/or reward paths based on who is at fault (e.g., ego-vehicle 800 at fault more penalized but other actor at fault then less penalized), penalize and/or reward based on how early or late a collision occurs in the proposed path (e.g., if collision occurs more immediately, such as within first couple of time steps, then penalize more, and if collision occurs further into path, such as at a final time step, then penalize less), and/or the like.

As such, in some embodiments, the candidate path manager 116 may generate paths, the paths may be analyzed in view of state uncertainty representations at any of the various points along the paths, the paths with factored in uncertainty may be analyzed in view of constraints, and the paths may be penalized and/or rewarded based on the determinations. As such, where paths are valid (e.g., don't result in an estimated collision or otherwise satisfy constraints), the paths may be selectable by the path selector of the candidate path manager 116 as paths for the vehicle 800. However, where paths are invalid (e.g., result in estimated collision or don't otherwise satisfy constraints imposed thereon), the paths may be penalized and either discarded as potential paths for the vehicle 800 and/or used by the candidate path manager 116 to generate an updated path that may avoid or take into consideration the issues with the invalid paths.

In some embodiments, the candidate path manager 116 may generate an initial path, and this path may be analyzed for state uncertainty and/or in view of constraints imposed thereon (e.g., by the intersection checker 114). As a result of the analysis, a penalty may be imposed on the path and the candidate path manager 116 may generate another path in view of this penalty, and the updated path may be analyzed for state uncertainty and/or in view of constraints imposed thereon. This process may be repeated until a suitable path (e.g., a path that satisfies constraints) is generated, and/or some time period expires at which time a most suitable path may be selected (and the process may move to a next time step and repeat again for a newly generated path corresponding to a next time step).

In other embodiments, the candidate path manager 116 may execute a brute force approach and may generate any number of paths at the outset, and each of the paths may be analyzed for state uncertainty and/or in view of constraints imposed thereon (e.g., using the intersection checker 114). As a result of the analysis, one or more of the paths may be determined to be suitable by the path selector for execution by the vehicle 800.

In some instances, the candidate path manager 116 and/or the intersection checker 114 may enforce a minimum stochastic distance from an obstacle by constructing a constraint of the optimization problem during the planning phase. This minimum stochastic distance can be used in path planning such that through a selected path of the autonomous vehicle, the vehicle maintains the minimum stochastic distance from surrounding obstacles at all times.

In some embodiments, the minimum stochastic distance may relate to a cost term that is added to a model predictive control formulation using a Mahalanobis distance. For example, this cost term may use an inverse distance based approach that may be represented as follows, in equations (72)-(73):

$$c(k) = \max_{l,m} \xi_{lm}(k) \tag{72}$$

$$\xi_{lm}(k) = \begin{cases} \dfrac{1}{\sqrt{(p_l(k) - q_m(k))^T P_l(k)^{-1}(p_l(k) - q_m(k))}}, & \text{if } (p_l(k) - q_m(k))^T P_l(k)^{-1}(p_l(k) - q_m(k)) < \gamma^2 \\ 0, & \text{otherwise} \end{cases} \tag{73}$$

As another example, this cost term may use an approach based on likelihood evaluations that may be represented as follows, in equations (74)-(75):

$$c(k) = \max_{l,m} \xi_{lm}(k) \approx \log\left(\sum\nolimits_{l,m} \exp(\xi_{lm})\right) \tag{74}$$

$$\xi_{lm}(k) = \dfrac{1}{\sqrt{|P_l(k)|(2\pi)^2}} \exp\left(-\dfrac{1}{2}(p_l(k) - q_m(k))^T P_l(k)^{-1}(P_l(k) - q_m(k))\right) \tag{75}$$

In Equation (74), the max function may imply that the formulation considers a worst-case scenario. A constraint may also be added to enforce that the minimum stochastic distance between the vehicle 800 (e.g., based on the uncertainty representation) and an obstacle remains larger than a safety threshold (e.g., $\gamma^2$). The max function in equation (74) may be non-differentiable, it may be approximated to a log-sum-exponential function.

To perform path planning, the following exemplary equations may be used as follows, in equations (76a)-(76e):

$$\underset{u \in R, \lambda \in \Lambda_D}{\text{minimize}} \quad (76a)$$

$$\sum_{i=1}^{D} \lambda_i \left\{ \sum_{k=1}^{N} \gamma_y (y(k) - y_i^{desired}(k))^2 + \sum_{k=2}^{N} \gamma_j (u(k) - u(k-1))^2 \right\}$$

subject to $$X(1) = A_d x(0) + B_d z^{-d} u^*(0) \quad (76b)$$

$$c(k) \leq \gamma^2, \quad k = 1 \ldots N \quad (76c)$$

$$X(k+1) = A_d x(k) + B_d u(k-1), \quad k = 1 \ldots N-1 \quad (76d)$$

$$u_{max} \leq u(k) \leq u_{max}, \quad k = 1 \ldots N-2 \quad (76e)$$

Using such equations, $\Lambda_D$ may be a D dimensional order simplex set that may be represented as follows, in equation (77) where D={1, 2, ..., D}:

$$\Lambda_D := \{\lambda \in \mathbb{R}^D | \Sigma_{k=1}^{D} \lambda_k = 1, \lambda_k \geq 0, \forall k \in D\} \quad (77)$$

Once candidate paths are generated and uncertainty is factored in, intersection checks may be executed using an intersection checker 114. Performing intersection checks can be performed between a vehicle (e.g., the vehicle 800) and an actor (e.g., an obstacle). For example, individual points (e.g., one or more first locations in space occupied by the vehicle 800 in view of one or more second locations in space occupied an actor) may be analyzed. Intersection checks may rely on an assumption that all objects (e.g., the vehicle 700 and actors or obstacles) should perform safely and according to the rules of the road—taking into account some uncertainty in movement of various actor or obstacle types. With this approach, a collision should not occur unless one of the objects did not do what was required. When a collision occurs, fault may be clearly determined because at least one of the objects likely did not follow a safe path, did not execute a safety procedure, and/or did not obey the rules of the road.

In some examples, the actor may include other vehicles (e.g., cars, trucks, motorcycles, busses, etc.) that may be capable of communicating with the vehicle 800 directly and/or indirectly. For example, the actor(s) may communicate directly with the vehicle 800 via vehicle-to-vehicle communication, such as over one or more network types (e.g., local area wireless networks). In other examples, the actor(s) may communicate indirectly with the vehicle 800, such as via server(s) or one or more network(s) (e.g., over a cellular network). In such examples, the actor(s) may communicate with the server(s) and the server(s) may communicate with the vehicle 800, and vice versa. The information received from and/or about the actor(s) may also be used by the path selector of the candidate path manager 116 and/or other component, features, and/or functionality of the vehicle 800.

With respect to actors or obstacles in the environment, the size of an actor or obstacles may be determined using one or more sensors and sensor data therefrom related to vehicle 800, and/or one or more machine learning models (e.g., convolutional neural networks). In some examples, for determining the size of an actor (e.g., an obstacle), a shape (e.g., a predefined shape, such as a square, polygon, bounding box, cube, circle, oval, ellipse, etc.) may be fit around the actor (e.g., to at least include the actor) and the size of the actor may be determined to be the size of the predefined shape (e.g., including a safety margin, in some examples, as described herein). For example, the shape may be a two-dimensional shape (e.g., a rectangle or circle), that serves as a bounding box that encircles the actor at least partially. In other examples, the shape may be a three-dimensional shape (e.g., a cube) that serves as a bounding cube that encircles the actor at least partially to define a volume in world space that the actor occupies—e.g., factoring in uncertainty considerations. In any example, the size of the vehicle may be used by intersection checker 114 to determine one or more locations in space corresponding to the actor.

A path selector of the candidate path manager 116 may be used to select a path from the candidate paths that are generated. For instance, the path selector can analyze generated candidate paths to ensure that the vehicle 800—e.g., and an uncertainty representation associated therewith at points along the path—maintains a minimum stochastic distance from all actors at all times. As an example, two path candidates can be generated at each time step. For instance, a first path candidate where the autonomous vehicle stays in the current lane and a second path candidate where the autonomous vehicle changes lanes. These two candidate paths can then be analyzed by the path selector to determine which candidate path ensures that the vehicle 800 maintains a minimum stochastic distance (or other measured distance type) from all actors at all times.

A selected path candidate can be executed using the control component(s) 118. For instance, the selected path candidate can be executed using a control layer. In executing a selected path candidate, the control component(s) 118 may cause the vehicle 800 to follow the path of the selected path candidate. For instance, when an ego vehicle (e.g. vehicle 800) triggers a lane change, a selected path candidate from the path candidates generated based on the uncertainty representation for the autonomous vehicle can be used to ensure that the autonomous vehicle can successfully change lanes while avoiding any actors (e.g., obstacles) in lane that the autonomous vehicle is moving into.

In some embodiments, a tractor model can be imposed as equality constraints in equations (78b) and (78c), where $A_d$ and $B_d$ can be obtained by linearizing the trailer model around a current state (e.g., $[\psi_1(k-1), \psi_a(k-1)]^T$. In an embodiment were only two path candidates are generated, D=2. Once a generated candidate path is selected (e.g., according to the solution of the optimization problem given (76a)-(76e)), a controller can be used to execute the path such that the autonomous vehicle follows the selected candidate path.

To execute a selected path candidate, the following exemplary equations can be used as follows, in equations (78a)-(87d):

$$\underset{u \in R}{\text{minimize}} \sum_{k=1}^{N} \beta_y (y(k) - y^{desired}(k))^2 + \sum_{k=2}^{N} \beta_j (u(k) - u(k-1))^2 \quad (78a)$$

subject to $$X(1) = A_d x(0) + B_d z^{-d} u^*(0) \quad (78b)$$

$$X(k+1) = A_d X(k) + B_d u(k-1) \quad k = 1 \ldots N-1 \quad (78c)$$

$$u_{max} \leq u(k) \leq u_{max}, \quad k = 1 \ldots N-2 \quad (78d)$$

Figure 3:
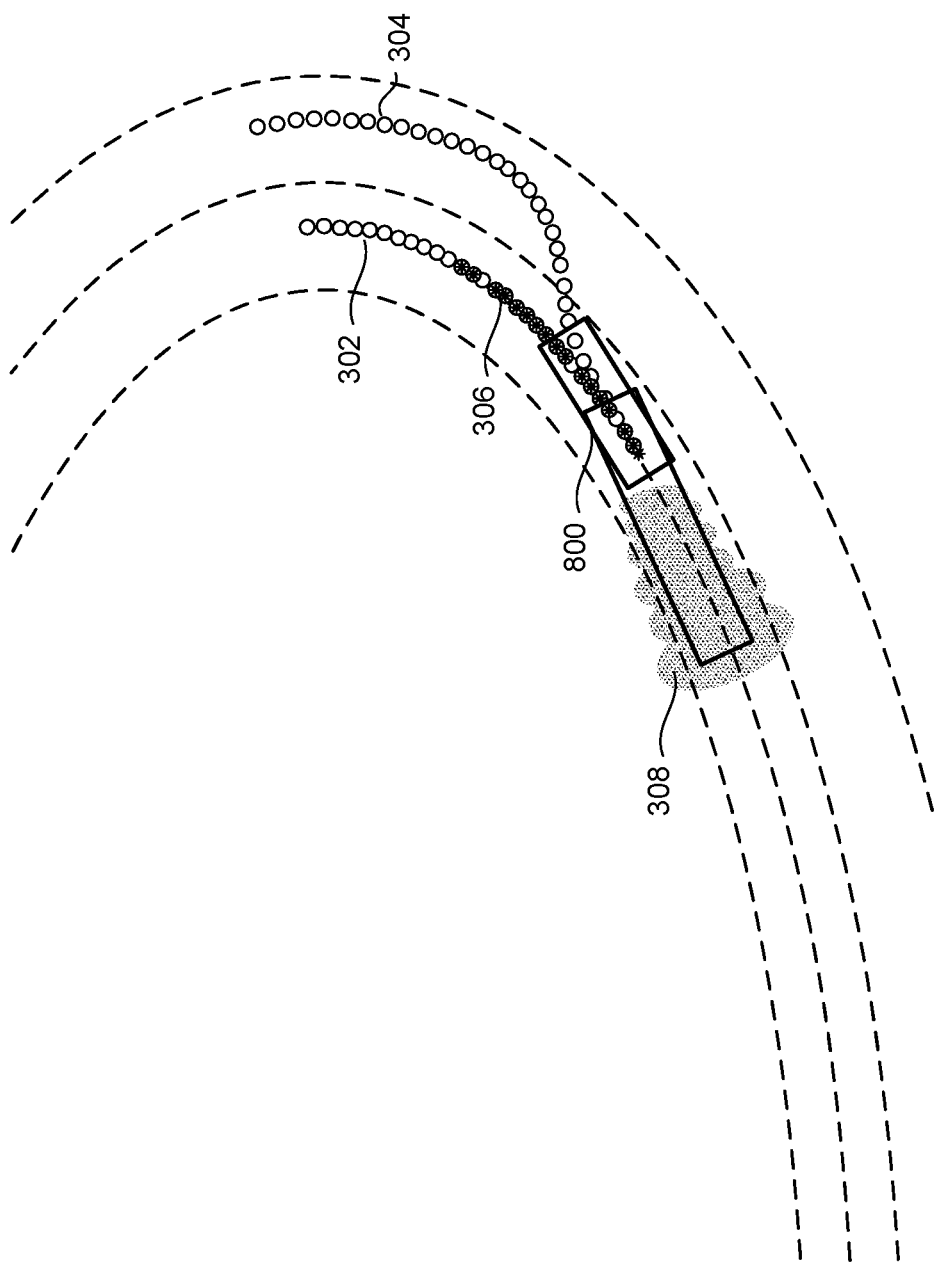
FIG. 3 depicts an example of space-time plots of a candidate path generated for a vehicle based on collision avoidance considerations using an uncertainty representation for a vehicle, in accordance with some embodiments of the present disclosure.

As such, and with respect to FIG. 3, the candidate path manager 116 may generate the candidate paths 302 and 304 for the vehicle 800. These candidate paths may be generated based at least in part on an uncertainty representation 308 related to the vehicle 800. From the candidate paths, the path selector of the candidate path manager 116 may select a candidate path to execute. For example, the path selector can analyze the candidate paths to determine which candidate path ensures that the vehicle 800 maintains a minimum stochastic distance from all actors at all times. Based on the selected candidate path (e.g., candidate path 302), control component(s) 118 may execute a portion of the selected candidate path 306.

Figure 4A:
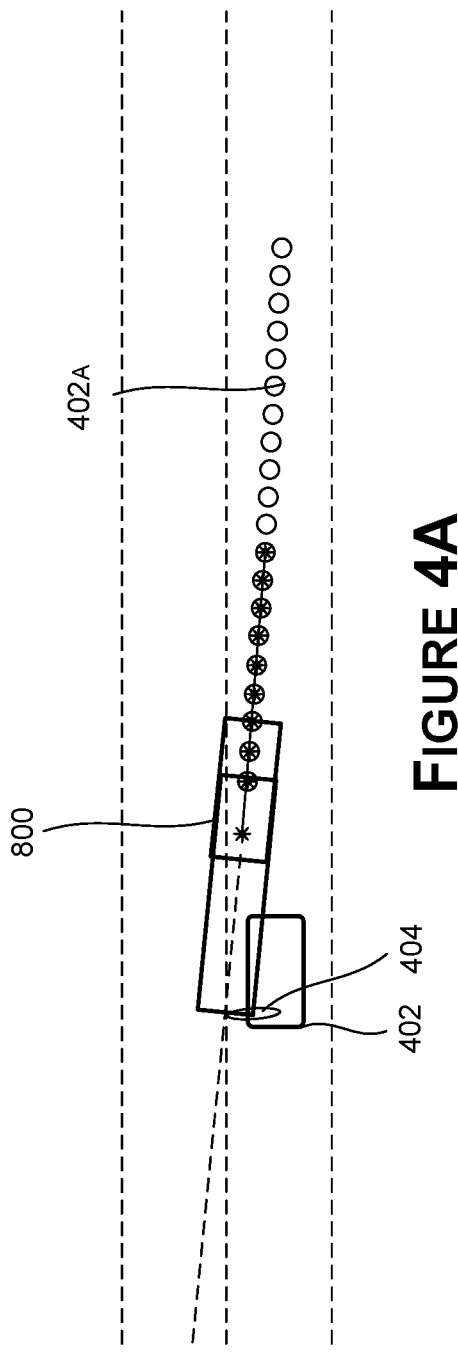
FIGS. 4A-4B depict paths corresponding to simulated lane changes with and without collision avoidance using an uncertainty representation of a vehicle, in accordance with some embodiments of the present disclosure.
Figure 4B:
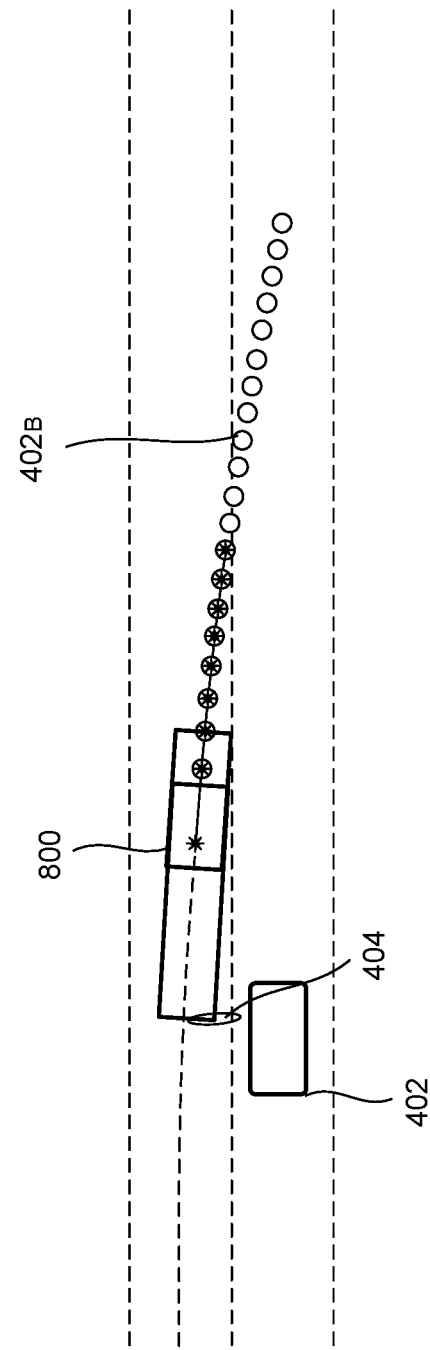
Figure 4C:
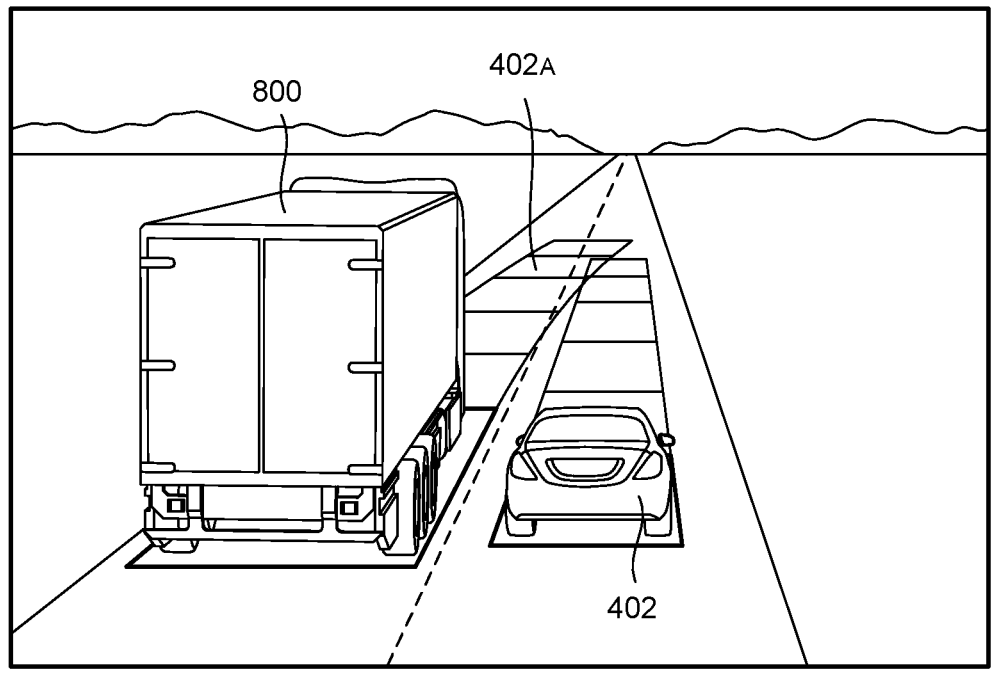
FIGS. 4C-4D depict three-dimensional representations of paths corresponding to simulated lane changes using an uncertainty representation of a vehicle, in accordance with some embodiments of the present disclosure.

Examples of candidate paths based on an uncertainty representation of a vehicle are illustrated with respect to FIGS. 4A-4C. In particular, FIGS. 4A-4C may depict a simulated lane change using an uncertainty representation related to a trailer portion of a vehicle 800. For instance, actor 402 (e.g., an obstacle vehicle) may be located in a target lane. Based on the actor 402 being located in the target lane, a lane change may be triggered for vehicle 800. For example, in FIG. 4A, a candidate path 402a for executing the lane change can be analyzed in relation to the actor 402. Based on the uncertainty representation 404 related to the vehicle 800, a collision is likely to occur between the vehicle 800 and the actor 402. In FIG. 4B, the uncertainty representation can be used for collision avoidance. For example, a candidate path 402b for executing the lane change can be analyzed in relation to the actor 402. Based on the uncertainty representation 404 related to the vehicle 800, a collision is not likely to occur between the vehicle 800 and the actor 402.

Figure 4D:
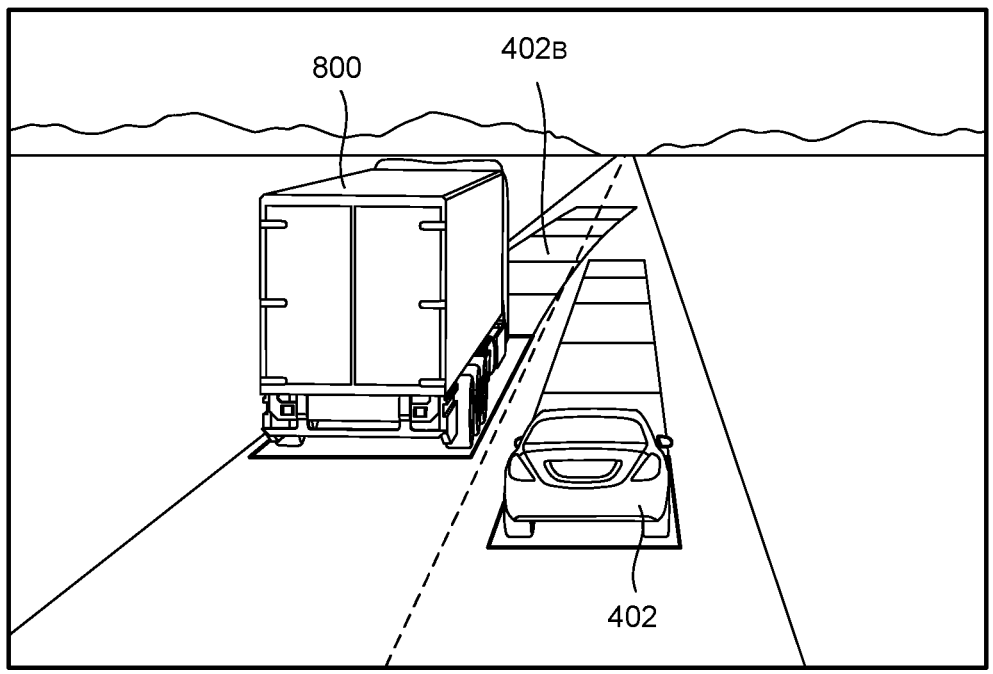

FIGS. 4C-4D depict three-dimensional representations of a simulated lane change—e.g., the simulated lane changes of FIGS. 4A-4B using an uncertainty representation related to a trailer portion of a vehicle. In particular, FIG. 4C depicts actor 402 (e.g., an obstacle vehicle) may be located in a target lane. Based on the actor 402 being located in the target lane (e.g., right lane), a lane change may be triggered for vehicle 800. For example, in FIG. 4C, a candidate path 402a for executing the lane change can be analyzed in relation to the actor 402. Based on an uncertainty representation related to the vehicle 800, a collision is likely to occur between the vehicle 800 and the actor 402. In FIG. 4D, an uncertainty representation can be used for collision avoidance. For example, a candidate path 402b for executing the lane change can be analyzed in relation to the actor 402. Based on an uncertainty representation related to the vehicle 800, a collision is not likely to occur between the vehicle 800 and the actor 402.

Figure 5:
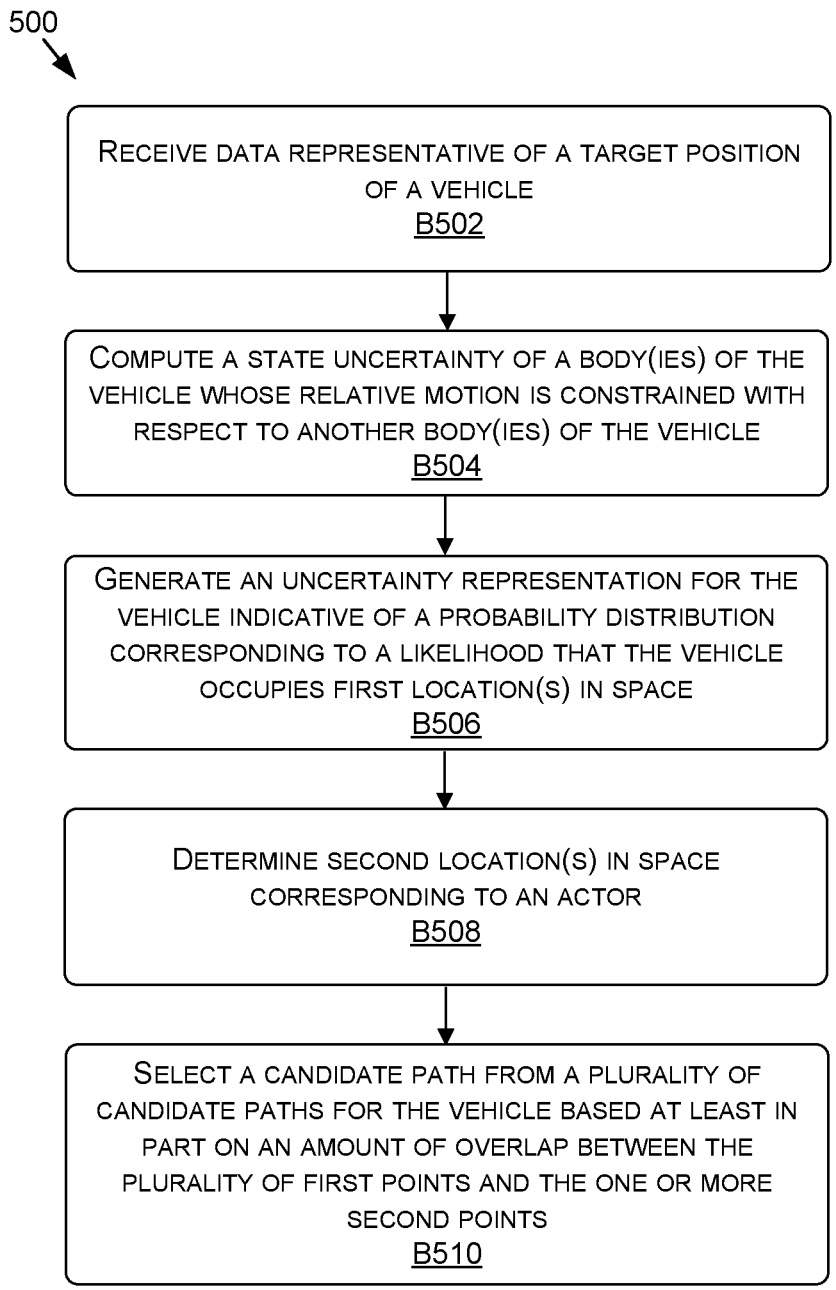
FIG. 5 is a flow diagram showing a method for generating candidate paths based on an uncertainty representation for a vehicle, in accordance with some embodiments of the present disclosure.
Figure 6:
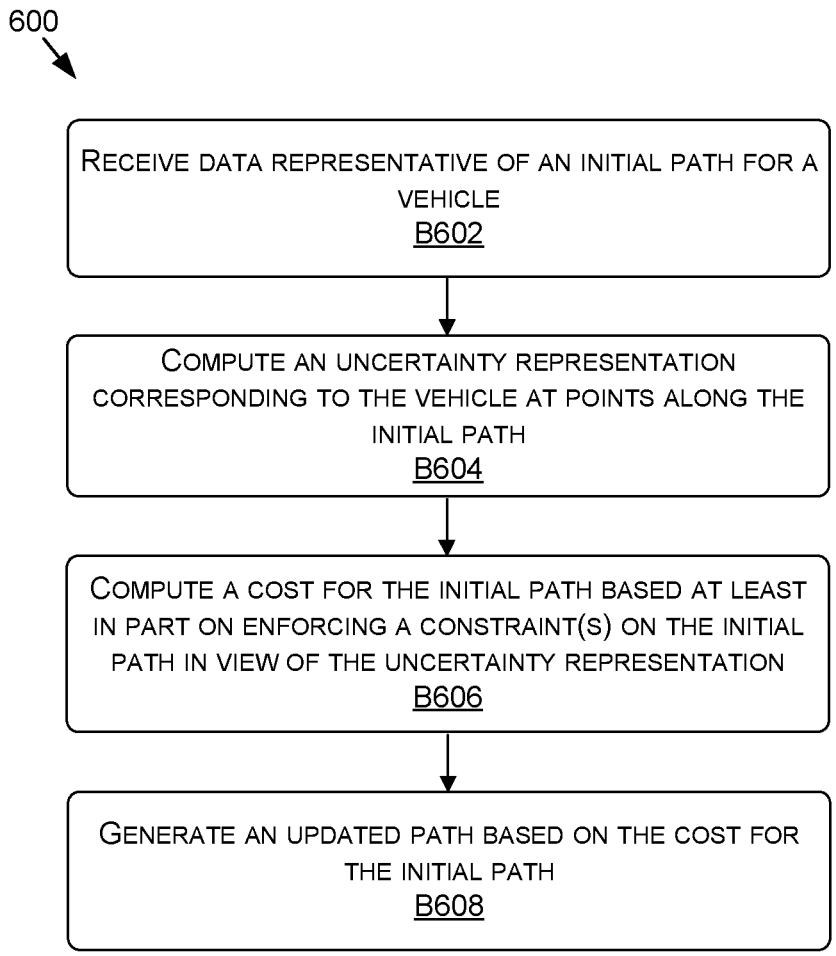
FIG. 6 is a flow diagram showing a method for selecting a generated candidate path based on obstacle avoidance using an uncertainty representation for a vehicle, in accordance with some embodiments of the present disclosure.
Figure 7:
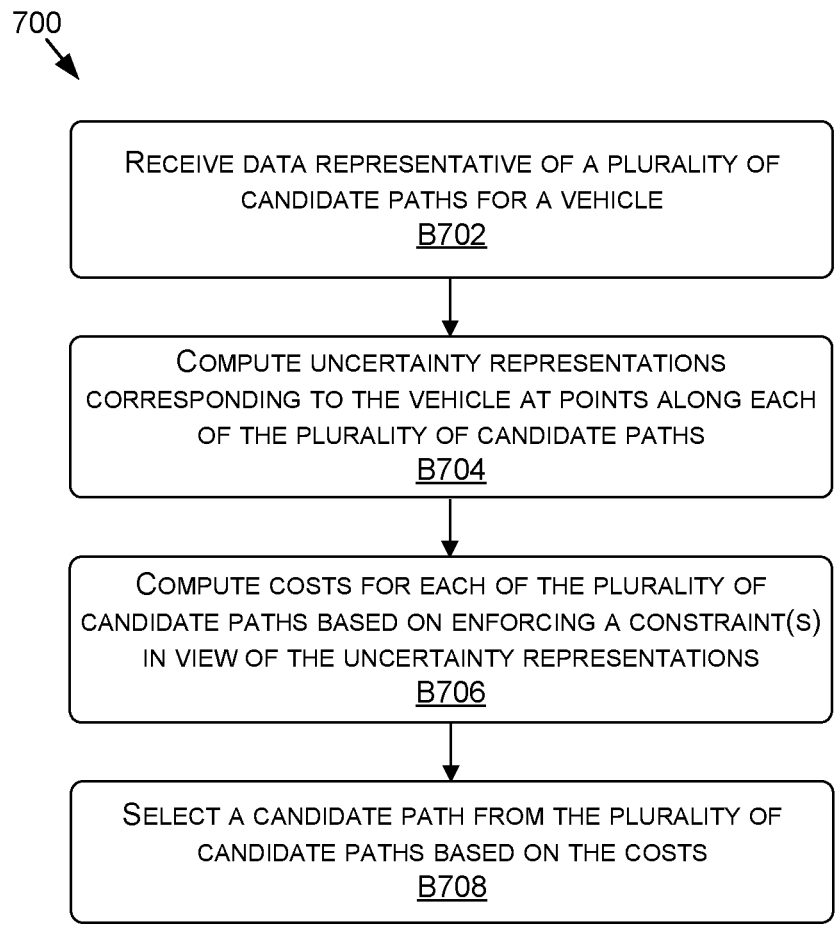
FIG. 7 is a flow diagram showing a method for brute force path generation and selection, in accordance with some embodiments of the present disclosure.

Now referring to FIGS. 5, 6, and 7, each block of methods 500, 600, and 700, described herein, comprises a computing process that may be performed using any combination of hardware, firmware, and/or software. For instance, various functions may be carried out by a processor executing instructions stored in memory. The methods 500, 600, and 700 may also be embodied as computer-usable instructions stored on computer storage media. The methods 500, 600, and 700 may be provided by a standalone application, a service or hosted service (standalone or in combination with another hosted service), or a plug-in to another product, to name a few. In addition, methods 500, 600, and 700 are described, by way of example, with respect to the process 100 of FIG. 1 and the vehicle 800 of FIGS. 8A-8D. However, these methods 500, 600, and 700 may additionally or alternatively be executed by any one system and/or process, or any combination of systems and/or processes, including, but not limited to, those described herein.

With reference to FIG. 5, FIG. 5 is a flow diagram showing a method 500 for generating candidate paths based on an uncertainty representation for a vehicle, in accordance with some embodiments of the present disclosure. The method 500, at block B502, includes receiving data representative of a target position of a vehicle. For example, the candidate path manager 116 may generate a path including target positions in world space for the vehicle 800.

The method 500, at block B504, includes computing a state uncertainty of a body(ies) of the vehicle whose relative motion is constrained with respect another body(ies) of the vehicle. For example, the state uncertainty determiner 104 may determine a state uncertainty for the vehicle 800 at any number of the target positions based on a state of the vehicle.

The method 500, at block B506, includes generating an uncertainty representation for the vehicle indicative of a probability distribution corresponding to a likelihood that the vehicle occupies first locations in space. For example, the uncertainty representation generator 106 may determine an uncertainty representation to indicate a set of predicted positions of the trailer and/or the tractor of the vehicle 800 (where the vehicle 800 is a tractor trailer). In particular, one of the discretized grid generator 108, the point(s) generator 110, or the convex hull generator 112 can be used to determine the uncertainty representation related to the vehicle 800. Further, the uncertainty representation may be based at least in part on the state uncertainty.

The method 500, at block B508, includes determining second location(s) in space corresponding to an actor. For example, the second location(s) in space may represent an occupied trajectory of the actor in 2D space or 3D space, and the occupied trajectory may be used to determine a projected trajectory for the actor.

The method 500, at block B510, includes selecting a candidate path from a plurality of candidate paths for the vehicle based at least in part on an amount of overlap between the plurality of first points and the one or more second points. For example, the intersection checker 114 may compare the uncertainty representation of the vehicle 800 with location(s) in space corresponding to the actor to determine if overlap is present, and may select a path with no overlap. Out of the paths with no overlap, other measures may be taken into account to select a final candidate, such as a comfort value. The comfort value may correspond to an average or statistical distance between the first points and the second points corresponding to the vehicle and the actor, respectively, such that a path that on average keeps the most distance between the uncertainty representations of the vehicle 800 and the surrounding actors may be selected as path.

With reference to FIG. 6, FIG. 6 is a flow diagram showing a method 600 for selecting a generated candidate path based on obstacle avoidance using an uncertainty representation for a vehicle, in accordance with some embodiments of the present disclosure. The method 600, at block B602, includes receiving data representative of an initial path for a vehicle. For example, the candidate path manager 116 may generate an initial path including any number of target locations in world space for the vehicle 800.

The method 600, at block B604, includes computing an uncertainty representation corresponding to the vehicle at points along the initial path. For example, the uncertainty representation generator 106 may generate an uncertainty representation for each of a plurality of the target locations.

The method 600, at block B606, includes computing a cost for the initial path based at least in part on enforcing a constraint(s) on the initial path in view of the uncertainty representation. For example, the intersection checker 114 may analyze the uncertainty representations at the target points in view of one or more actors in an environment and determine a cost or penalty for the path where overlap occurs—or a constraint is otherwise not satisfied (e.g., even where no actual overlap occurs, if a minimum stochastic distance is not maintained the path may still be penalize).

The method 600, at block B608, includes generating an updated path based on the cost corresponding to the initial path. For example, the path manager 116 may generate an updated path based on the cost or penalties associated with the initial path. The updated path may be a newly generated path, another previously generated path, and/or an update to some but not all of the points of the initial path.

This process may be repeated until a suitable path candidate is generated and/or analyzed to determine constraints are satisfied, or until an end of a predetermined time period for processing.

Now referring to FIG. 7, FIG. 7 is a flow diagram showing a method 700 for brute force path selection, in accordance with some embodiments of the present disclosure. The method 700, at block B702, includes receiving data representative of a plurality of candidate paths for a vehicle. For example, the candidate path manager 116 may generate any number of candidate paths each including any number of target locations in world space for the vehicle 800.

The method 700, at block B704, includes computing uncertainty representations corresponding to the vehicle at points along each of the plurality of candidate paths. For example, the uncertainty representation generator 106 may generate an uncertainty representation for each of a plurality of the target locations along each of the paths.

The method 700, at block B706, includes computing costs for each of the plurality of candidate paths based on enforcing a constraint(s) in view of the uncertainty representations. For example, the intersection checker 114 may analyze the uncertainty representations at the target points in view of one or more actors in an environment and determine a cost or penalty for the paths where overlap occurs—or a constraint is otherwise not satisfied (e.g., even where no actual overlap occurs, if a minimum stochastic distance is not maintained the path may still be penalize).

The method 700, at block B708, includes selecting a candidate path from the plurality of candidate paths based on the costs. For example, once costs are penalties are assigned to each of the paths, the least penalized path(s) may be selected by the path selector, and the selected path(s) may be passed to the control component(s) 118. In some embodiments, in addition to the system 100 analyzing, penalizing, and selecting paths, additional considerations may be weighed by the vehicle 800 in determining a final path to follow. For example, comfort, safety procedure execution analysis, obeying rules of the road, and/or other considerations may be factored in to determine which of the selected paths from the system 100 is a best or most suitable path for the vehicle 800 at a current time step.

Example Autonomous Vehicle

Figure 8A:
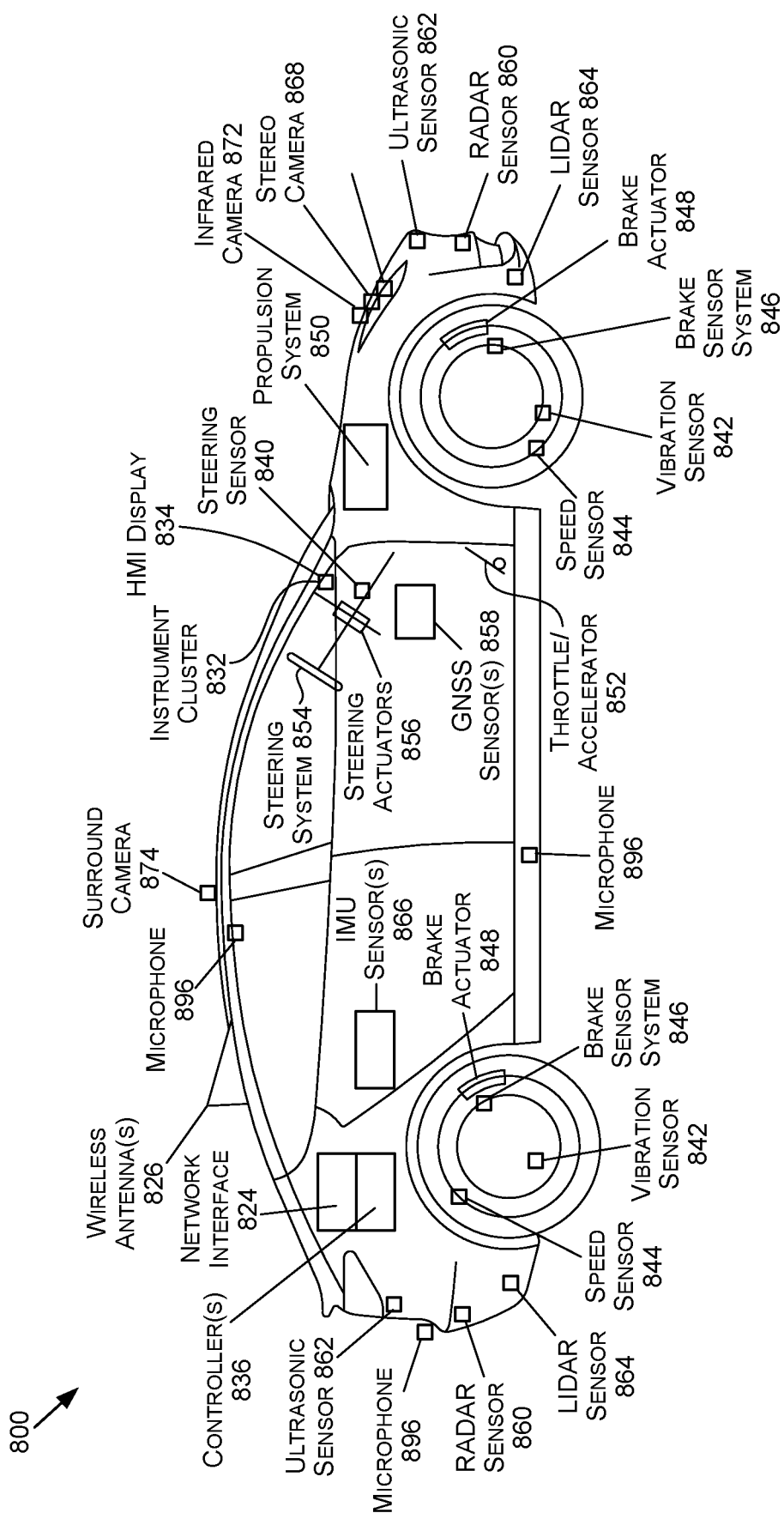
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. For example, the vehicle 800 may be capable of conditional automation (Level 3), high automation (Level 4), and/or full automation (Level 5), depending on the embodiment.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 8B:
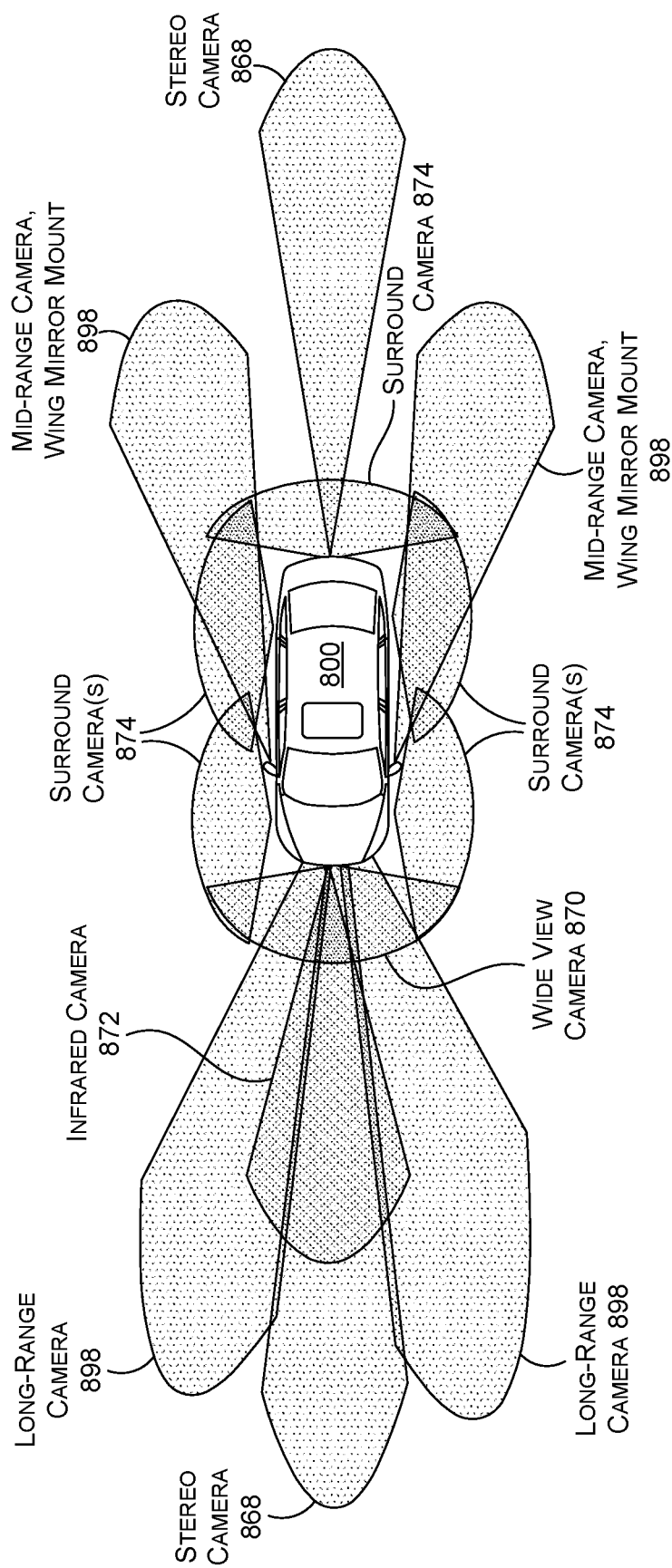
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASTL) B and/or at another ASIL. The camera types may be capable of any image capture rate, such as 60 frames per second (fps), 820 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
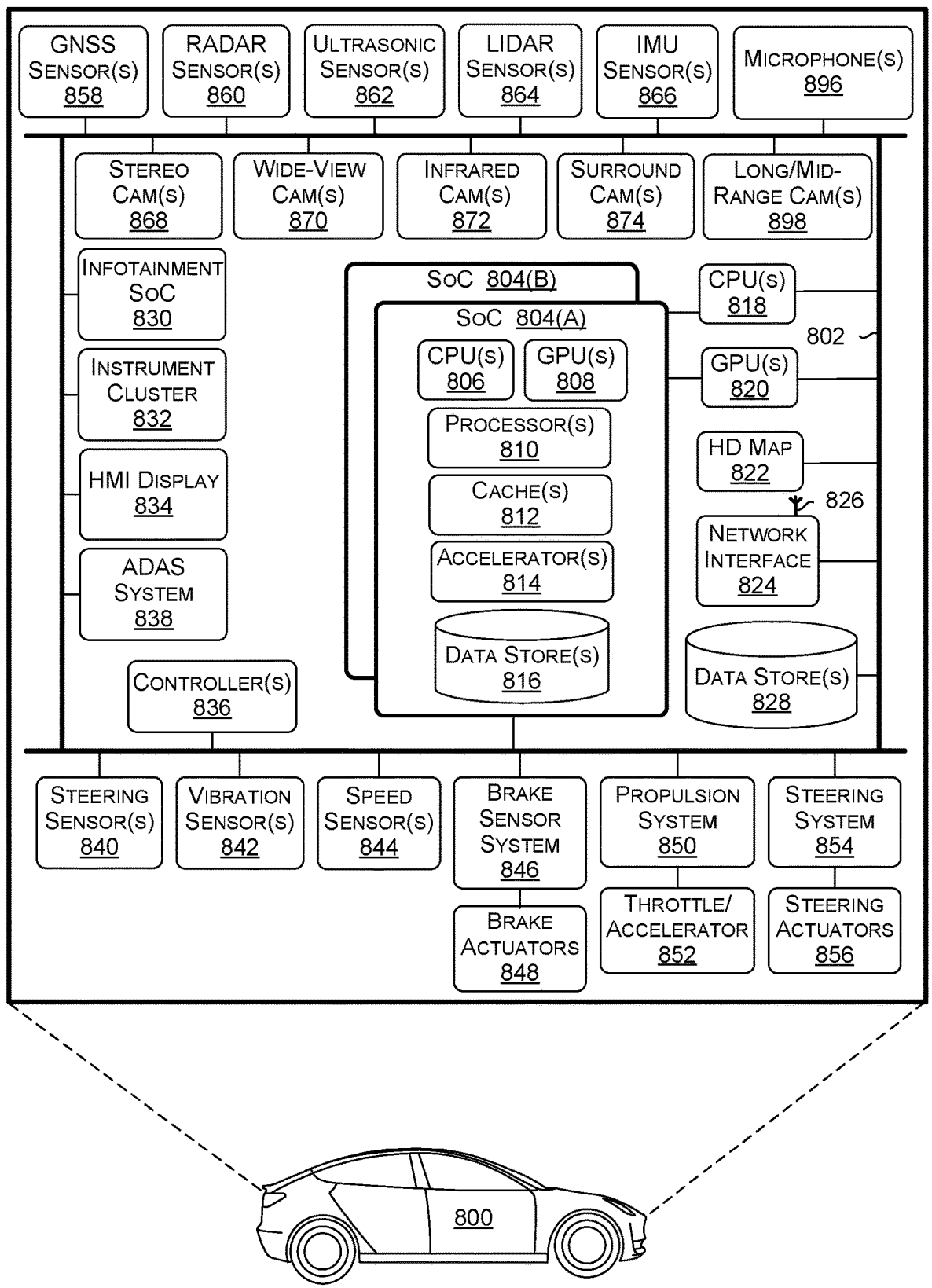
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol.

In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASTL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 820-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
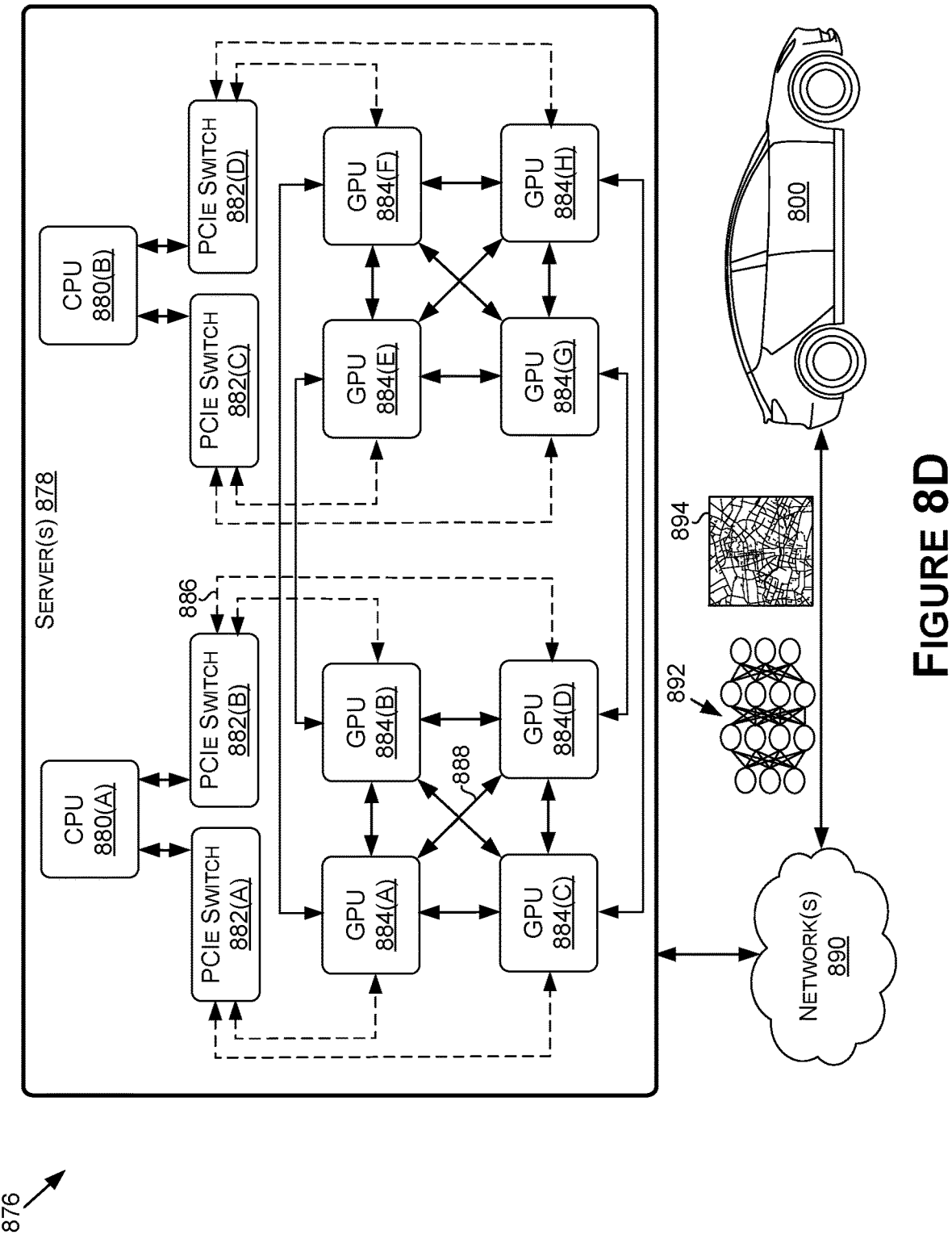
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet,"

"client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    based at least on a target position and an orientation of a vehicle, computing a state uncertainty of one or more bodies of the vehicle whose relative motion is constrained with respect to one or more other bodies of the vehicle;
    computing, at a time step, a confidence for an individual uncertainty representation type of a plurality of uncertainty representation types
    selecting, based at least on the confidence, the uncertainty representation type of the plurality of uncertainty representation types for generating an uncertainty representation;
    based at least on the state uncertainty, generating an uncertainty representation for the vehicle indicative of a probability distribution corresponding to a likelihood that the vehicle will occupy individual points of a plurality of first points in world space, wherein:
        a first portion of the probability distribution that corresponds to a nominal position of the one or more bodies being associated with one or more first probability values; and
        a second portion of the probability distribution that corresponds to the state uncertainty of the one or more bodies being associated with one or more second probability values;
    determining one or more second points in world space corresponding to an actor;
    selecting a candidate path from a plurality of candidate paths for the vehicle based at least on an amount of overlap between the plurality of first points and the one or more second points; and causing the vehicle to navigate according to the candidate path.

2. The method of claim 1, wherein the generating the uncertainty representation is based at least on a discretized grid, an individual cell in the discretized grid representing a probability of the individual cell being occupied by the vehicle.

3. The method of claim 1, wherein the uncertainty representation is based at least on a stochastic distance from a body point corresponding to the vehicle, and uncertainty at the body point is represented using an ellipse.

4. The method of claim 3, wherein the generating the uncertainty representation is based at least on one or more additional stochastic distances from one or more additional body points corresponding to the vehicle, and respective uncertainties at individual body points of the body points of the additional body points is represented using an ellipse.

5. The method of claim 1, wherein the generating the uncertainty representation is based at least on a computed footprint of equal probability extending from one or more body points of the vehicle, an individual body point of the one or more body points being represented using an ellipse.

6. The method of claim 1, further comprising generating the candidate path for the vehicle based at least on a minimum stochastic distance between the uncertainty representation of the vehicle and the one or more second points in world space determined to correspond to the actor.

7. The method of claim 1, wherein the vehicle is a tractor trailer, and the relative motion of a trailer of the tractor trailer is constrained with respect to a tractor of the tractor trailer.

8. The method of claim 1, wherein the generating the uncertainty representation includes using a linear feedback controller to prevent the uncertainty representation from going unbounded.

9. The method of claim 1, wherein the one or more first probability values associated with the nominal position of the one or more bodies are greater than the one or more second values associated with the state uncertainty of the one or more bodies.

10. The method of claim 1, wherein:
a first point of the second portion of the plurality of first points is located a first distance from the first portion of the plurality of first point;
a second point of the second portion of the plurality of first points is located a second distance from the first portion of the plurality of first point, the second distance being greater than the first distance; and
based at least on the second distance being greater than the first distance, a first probability value of the one or more second probability values that is associated with the first point is greater than a second probability value of the one or more second probability values that is associated with the second point.

11. A system comprising:
one or more processing units to:
determine one or more locations in world space corresponding to a target position along a plurality of candidate paths of a vehicle;
determine a current state of the vehicle, the current state including at least a position and orientation of the vehicle;
compute, at a time step, a confidence for an individual uncertainty representation type of a plurality of uncertainty representation types;

select, based at least on the confidence, the uncertainty representation type of the plurality of uncertainty representation types for generating one or more uncertainty representations associated with the candidate path;

based at least on the current state of the vehicle and the one or more locations, generate the one or more uncertainty representations for the vehicle along a plurality of candidate paths, an uncertainty representation of the one or more uncertainty representations corresponding to a probability that the vehicle occupies a plurality of first points in world space;

determine a plurality of second points corresponding to an actor detected based at least on sensor data generated using one or more sensors of the vehicle;

determine at least an overlap penalty for a first candidate path of the plurality of candidate paths based at least on an amount of overlap between the plurality of first points and the plurality of second points;

determine a filtered set of candidate paths based at least on filtering out the first candidate path that is associated with the overlap penalty that is greater than a threshold;

select a second candidate path from the filtered set of candidate paths based at least on a comfort measure associated with the second candidate path; and cause the vehicle to navigate according to the second candidate path.

12. The system of claim 11, wherein the one or more processing units are further to determine one or more vehicle controls for controlling the vehicle according to the second-candidate path.

13. The system of claim 11, wherein the one or more processing units are further to:
determine an amount of overlap between the plurality of first points and the plurality of second points,
wherein the candidate path is selected based at least on the amount of overlap.

14. The system of claim 11, wherein the uncertainty representation is generated based at least on a discretized grid, an individual cell in the discretized grid representing a probability of the individual cell being occupied by the vehicle.

15. The system of claim 11, wherein the uncertainty representation is generated based at least on a stochastic distance from a body point corresponding to the vehicle, and uncertainty at the body point is represented using an ellipse.

16. The system of claim 11, wherein the uncertainty representation is generated based at least on a computed footprint of equal probability extending from one or more body points on the vehicle, an uncertainty of an individual body point of the one or more body points being represented using an ellipse.

17. The system of claim 11, wherein the one or more processing units are further to:
determine a comfort measure corresponds to an average stochastic distance between the uncertainty representation of the vehicle and one or more of the plurality of second points determined to correspond to the actor,
wherein the candidate path is further selected based at least on the comfort measure.

18. The system of claim 11, wherein the vehicle is a tractor trailer, and motion of a trailer of the tractor trailer is constrained with respect to a tractor of the tractor trailer.

19. The system of claim 11, wherein the system is comprised in at least one of:
a control system for an autonomous or semi-autonomous machine;

a perception system for an autonomous or semi-autonomous machine;
a system for performing simulation operations;
a system for performing deep learning operations;
a system implemented using a robot;
a system incorporating one or more virtual machines (VMs);
a system implemented at least partially in a data center; or
a system implemented at least partially using cloud computing resources.

20. A method comprising:
determining a current state of a vehicle, the current state including at least a position and orientation of the vehicle;
determining one or more locations in world space corresponding to a target position along a plurality of candidate paths of a vehicle;
computing, at a time step, a confidence for an individual uncertainty representation type of a plurality of uncertainty representation types;
selecting, based at least on the confidence, the uncertainty representation type of the plurality of uncertainty representation types for generating an uncertainty representation;
based at least on the state uncertainty for the vehicle at a time, generating the uncertainty representation for the vehicle along the plurality of candidate paths indicative of a probability that the vehicle occupies one or more first points in space, the vehicle comprising a tractor portion and a trailer portion, wherein a first portion of the uncertainty representation corresponds to a nominal position of the trailer portion and a second portion of the uncertainty representation corresponds to the state uncertainty of the trailer portion;
determining one or more second points in space corresponding to an actor based at least on sensor data generated using one or more sensors of the vehicle; and
determining at least an overlap penalty for a first candidate path of the plurality of candidate paths based at least on an amount of overlap between the plurality of first points and the plurality of second points;
determine a filtered set of candidate paths based at least on filtering out the first candidate path that is associated with the overlap penalty that is greater than a threshold;
selecting a second candidate path from the filtered set of paths based at least on a comfort measure associated with the second candidate path; and
causing the vehicle to navigate according to the second candidate path.

* * * * *